United States Patent
Sato et al.

(10) Patent No.: US 8,470,486 B2
(45) Date of Patent: Jun. 25, 2013

(54) FUEL CELL SYSTEM

(75) Inventors: Masashi Sato, Yokohama (JP); Susumu Maeshima, Yokohama (JP); Kazuo Saito, Yokohama (JP); Ryoichi Shimoi, Yokohama (JP); Takahiro Fujii, Kanagawa (JP); Nobuo Matsuba, Ebina (JP); Hitoshi Igarashi, Yokohama (JP); Kenji Yonekura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1084 days.

(21) Appl. No.: 12/339,832

(22) Filed: Dec. 19, 2008

(65) Prior Publication Data

US 2009/0169927 A1 Jul. 2, 2009

(30) Foreign Application Priority Data

Dec. 27, 2007 (JP) ................. 2007-337249

(51) Int. Cl.
*H01M 8/04* (2006.01)
(52) U.S. Cl.
USPC .......................................................... 429/446
(58) Field of Classification Search
USPC .......................................................... 429/446
See application file for complete search history.

(56) References Cited

U.S. PATENT DOCUMENTS

| | | |
|---|---|---|
| 6,461,751 B1 | 10/2002 | Boehm et al. |
| 2003/0022044 A1* | 1/2003 | Inai et al. ................... 429/23 |
| 2004/0185319 A1* | 9/2004 | Enjoji et al. ................ 429/34 |
| 2005/0003245 A1* | 1/2005 | Mattejat et al. ............. 429/13 |
| 2007/0196707 A1 | 8/2007 | Komachiya et al. |

FOREIGN PATENT DOCUMENTS

| | | |
|---|---|---|
| EP | 1 279 940 A2 | 1/2003 |
| JP | 2003-45466 | 2/2003 |
| JP | 2003-045467 | 2/2003 |
| JP | 2007165019 A * | 6/2007 |

OTHER PUBLICATIONS

JP 2007-165019 A (Matsuba) Jun. 28, 2007 (English language machine translation). [online] [retrieved Apr. 26, 2012]. Retrieved from: Advanced Industrial Property Network Japan Patent Office.*

* cited by examiner

*Primary Examiner* — Joseph S Del Sole
*Assistant Examiner* — Erin Snelting
(74) *Attorney, Agent, or Firm* — Drinker Biddle & Reath LLP

(57) ABSTRACT

A fuel cell system has a plurality of fuel cells stacked in one or more groups of fuel cells. Each fuel cell includes a fuel electrode supplied with fuel gas at a fuel gas supply pressure, an oxidizing electrode supplied with oxidizing gas at an oxidizing gas supply pressure, and an electrolyte membrane disposed between the fuel electrode and the oxidizing electrode. A pressure-difference control unit generates a pressure difference across the membrane such that the fuel gas supply pressure is greater than the oxidizing gas supply pressure in each fuel cell, a cell-voltage measuring device measures a cell voltage for each fuel cell or each group of fuel cells in the fuel cell stack, and a leakage determination unit determines the presence or absence of a leaking cell based on the behavior of the cell voltage of each fuel cell while the pressure difference is increased with time.

20 Claims, 12 Drawing Sheets

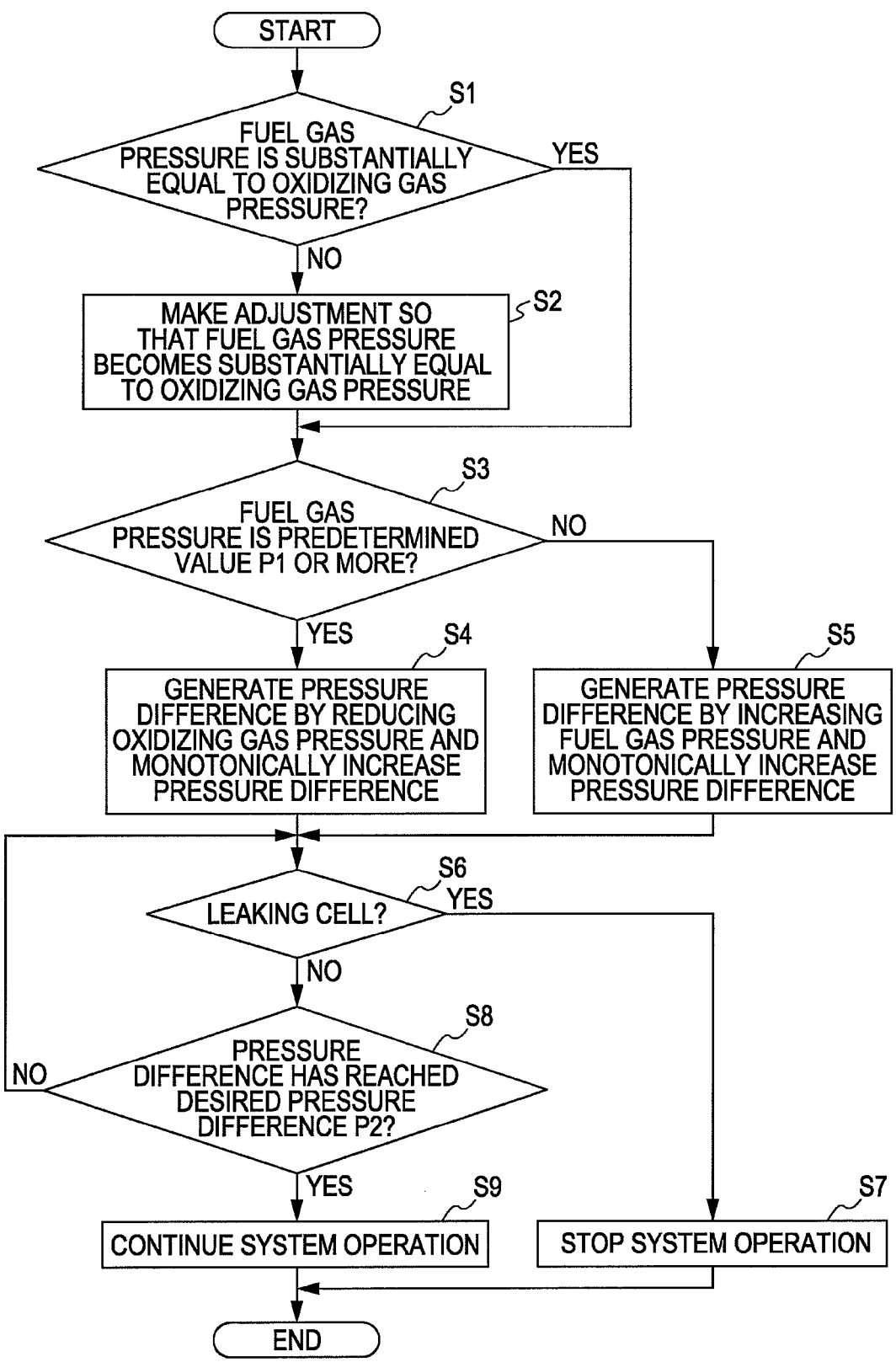

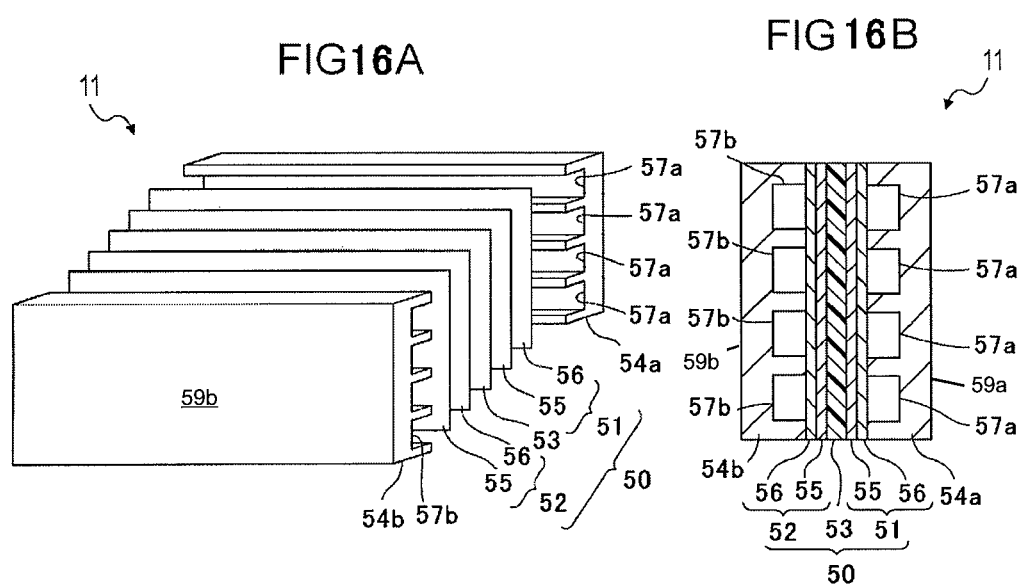

FUEL CELL SYSTEM

CROSS-REFERENCE TO RELATED APPLICATIONS

This application claims priority to Japanese Patent Application No. P2007-337249 filed Dec. 27, 2007, which is incorporated by reference herein in the entirety.

BACKGROUND OF THE INVENTION

1. Field of the Invention

The present invention relates to a fuel cell system which generates electric power when fuel gas and oxidizing gas are supplied to fuel cells included in a fuel cell stack, and more particularly, to a technique for determining the presence or absence of a leaking cell having an abnormal electrolyte membrane.

2. Description of the Related Art

A method exists in the prior art for determining whether or not there is a leaking cell having an abnormal electrolyte membrane in fuel cells included in a fuel cell stack. According to this method, an output voltage of each fuel cell is measured in an activation overvoltage region while the pressure of fuel gas supplied to a fuel electrode is set to be higher than the pressure of oxidizing gas supplied to an oxidizing electrode in each fuel cell. If there is a fuel cell whose output voltage is equal to or less than a predetermined voltage, that fuel cell is determined to be a leaking cell. A leaking cell is a fuel cell in which gas flows through the electrolyte membrane from the fuel-electrode side to the oxidizing-electrode side.

In the prior art determination method, a pressure difference is generated between the fuel gas at the fuel electrode and the oxidizing gas at the oxidizing electrode of each fuel cell such that the pressure at the fuel electrode is higher than that at the oxidizing electrode. The generated pressure difference is maintained constant, and the resultant velocity of gas that flows from the fuel-electrode side to the oxidizing-electrode side is constant. Therefore, when, for example, the leakage is caused by a very small hole in the electrolyte membrane, it takes a long time for the output voltage to be reduced to a voltage equal to or less than the predetermined voltage, which occurs in response to a reduction in the oxygen partial pressure at the oxidizing electrode. Thus, it is difficult to determine the presence or absence of a leaking cell in a short time.

SUMMARY OF THE INVENTION

In an embodiment of the present invention, a fuel cell system is provided. The fuel cell system includes a fuel cell stack in which a plurality of fuel cells are stacked in one or more groups of fuel cells, each fuel cell including a fuel electrode to which fuel gas containing hydrogen is supplied at a fuel gas supply pressure, an oxidizing electrode to which oxidizing gas containing oxygen is supplied at an oxidizing gas supply pressure, and an electrolyte membrane disposed between the fuel electrode and the oxidizing electrode. The membrane has a fuel-electrode side and an oxidizing-electrode side. The fuel cell system further includes a pressure-difference control unit for generating a pressure difference across the membrane between the fuel electrode and the oxidizing electrode in each fuel cell and for changing the pressure difference, the pressure difference being such that the pressure at the fuel electrode is higher than the pressure at the oxidizing electrode. The fuel cell system also includes a cell-voltage measuring device for measuring a cell voltage for each fuel cell or each group of fuel cells in the fuel cell stack and a leakage determination unit for determining the presence or absence of a leaking cell based on the behavior of the cell voltage of each fuel cell as measured by the cell-voltage measuring device while the pressure-difference control unit increases the pressure difference with time. A leaking cell is a fuel cell in which gas flows through the electrolyte membrane from the fuel-electrode side to the oxidizing-electrode side.

In another embodiment of the present invention, a fuel-cell control apparatus is provided. The fuel-cell control apparatus includes a fuel cell stack in which a plurality of fuel cells are stacked, each fuel cell including a fuel electrode, an oxidizing electrode, and a electrolyte membrane disposed between the fuel electrode and the oxidizing electrode, the fuel cell stack including fuel-gas supplying means which supplies fuel gas containing hydrogen to the fuel electrode of each fuel cell and oxidizing-gas supplying means which supplies oxidizing gas containing oxygen to the oxidizing electrode of each fuel cell. The apparatus further includes cell-voltage measuring means capable of measuring a cell voltage for each fuel cell or each group of fuel cells and pressure-difference control means capable of generating a pressure difference between the pressure of the fuel gas at the fuel electrode and the pressure of the oxidizing gas at the oxidizing electrode in each fuel cell and increasing the pressure difference with time, the pressure difference being such that a pressure at the fuel electrode is higher than a pressure at the oxidizing electrode. The apparatus also includes leakage determination means capable of determining the presence or absence of a leaking cell in which gas flows through the electrolyte membrane from the fuel-electrode side to the oxidizing-electrode side, the leakage determination means determining the presence of absence of a leaking cell based on the behavior of the cell voltage measured by the cell-voltage measuring means while the pressure difference is increased with time.

In a further embodiment of the present invention, a method is provided for determining whether or not a fuel cell stack includes a leaking cell, the fuel cell stack having a plurality of fuel cells stacked in one or more groups of fuel cells, each fuel cell including a fuel electrode to which fuel gas is supplied at a fuel gas supply pressure, an oxidizing electrode to which oxidizing gas is supplied at an oxidizing pressure, and an electrolyte membrane disposed between the fuel electrode and the oxidizing electrode. The method includes generating a pressure difference between the fuel gas supply pressure and the oxidizing gas supply pressure, and increasing the pressure difference with time, measuring a cell voltage for each fuel cell or group of fuel cells, determining whether or not a leaking cell is present based on the behavior of the cell voltage for each fuel cell or group of fuel cells while the pressure difference is increased with time, and controlling the operation of the fuel cell stack based on whether or not a leaking cell is present.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 10 is a flowchart of an example of the leakage determination process performed by the controller.

FIGS. 16A and 16B are diagrams illustrating an exemplary structure of a fuel cell.

DESCRIPTION OF THE PREFERRED EMBODIMENTS

Embodiments of the present invention will be described in detail below with reference to the accompanying drawings.

First Embodiment

Overall Structure

Figure 1:
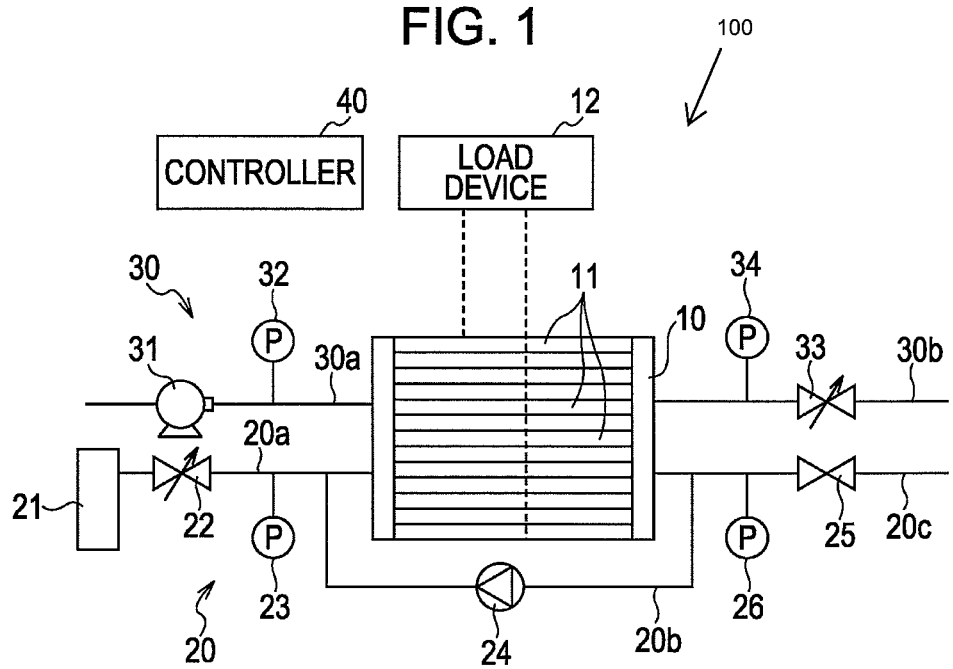
FIG. 1 is a system block diagram illustrating the overall structure of a fuel cell system according to the present invention.

FIG. 1 is a system block diagram illustrating the overall structure of a fuel cell system 100 according to a first embodiment of the present invention. The fuel cell system 100 shown in FIG. 1 is mounted in, for example, a fuel-cell vehicle so as to function as a power source for the vehicle, and supplies electric power to a load device 12, such as a driving motor of the vehicle or an auxiliary device. The fuel cell system 100 includes a fuel cell stack 10 in which a plurality of fuel cells 11 are stacked.

With reference to FIGS. 16A and 16B, each of the fuel cells 11 includes a membrane electrode assembly (MEA) 50 positioned between an anode separator 54a and a cathode separator 54b. The membrane electrode assembly includes a fuel electrode (an anode electrode) 51 which receives fuel gas and an oxidizing electrode (a cathode electrode) 52 which receives oxidizing gas. The fuel electrode 51 and the oxidizing electrode 52 face each other with a solid polymer electrolyte membrane 53 interposed therebetween. Each of the fuel electrode 51 and the oxidizing electrode 52 has a catalyst layer 55 and a gas diffusion layer (GDL) 56. The catalyst layer 55 includes, for example, carbon black particles on which platinum is supported. The fuel cell stack 10 is formed by stacking the fuel cells 11 in series with each other. The anode separator 54a and a cathode separator 54b included in each fuel cell 11 of the fuel cell stack 10 have, respectively, a fuel-gas flow path 57a through which the fuel gas flows at the fuel-electrode side of the membrane 53 and an oxidizing-gas flow path 57b through which the oxidizing gas flows at the oxidizing-electrode side of the membrane 53. The anode separator 54a and the cathode separator 54b each have a generally planar cell face, 59a and 59b, respectively. Fuel gas containing hydrogen is supplied to the fuel electrode 51 and oxidizing gas (air) containing oxygen is supplied to the oxidizing electrode 52 in each of the fuel cells 11 in the fuel cell stack 10. Water serves as a medium for causing ions to move through the solid polymer electrolyte membrane 53, and electric power is generated when the ions come into contact with one another.

Figure 2:
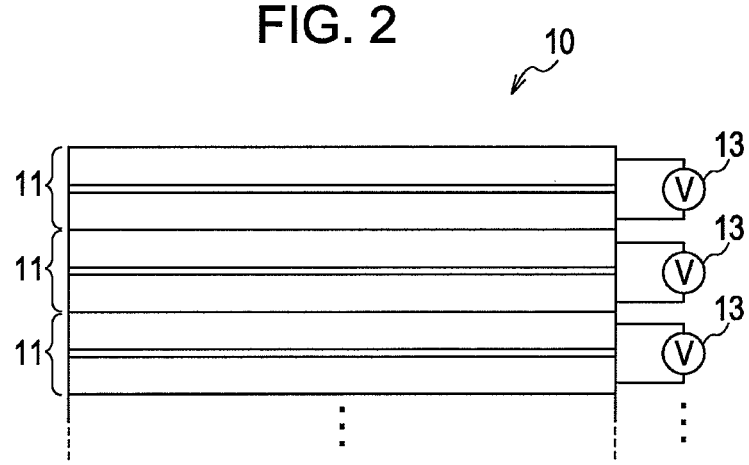
FIG. 2 is a schematic diagram illustrating the manner in which cell-voltage measuring devices are connected to a fuel cell stack in a fuel cell system.

The load device 12 is electrically connected to the fuel cell stack 10, and the electric power generated by the fuel cell stack 10 is transmitted to the load device 12. In addition, as shown in FIG. 2, cell-voltage measuring devices 13 for measuring voltages (hereinafter called cell voltages) of the respective fuel cells 11 are connected to the fuel cell stack 10. The cell-voltage measuring devices 13 measure the cell voltages of the respective fuel cells 11, and the measured cell voltages are input to a controller 40, which will be described below. The controller 40 uses the measured cell voltages in the process of determining the presence or absence of a leaking cell. It is not necessary that the cell-voltage measuring devices 13 measure the cell voltages of the respective fuel cells 11 individually, and the cell voltages may be measured for respective groups of fuel cells 11, each group including, for example, five fuel cells 11.

In addition to the fuel cell stack 10, the fuel cell system 100 also includes a hydrogen system 20 for supplying fuel gas (pure hydrogen or gas containing hydrogen) to the fuel cell stack 10, an air system 30 for supplying air, which functions as the oxidizing gas, to the fuel cell stack 10, and the controller 40 which controls the overall operation of the fuel cell system.

The hydrogen system 20 includes, for example, a fuel tank 21 which contains the fuel gas to be supplied to the fuel cell stack 10. The fuel gas contained in the fuel tank 21 is supplied through a fuel-gas supply path 20a to the fuel electrode in each of the fuel cells 11 included in the fuel cell stack 10. A fuel-gas-pressure regulating valve 22 and a fuel-electrode-inlet pressure sensor 23 are placed in the fuel-gas supply path 20a. The fuel-gas-pressure regulating valve 22 regulates the pressure of the fuel gas supplied to the fuel electrode in each fuel cell 11. The fuel-electrode-inlet pressure sensor 23 measures the pressure of the fuel gas at a fuel-electrode inlet of the fuel cell stack 10. The supply source of the fuel gas is not limited to the fuel tank 21, and other fuel-gas supply sources, such as a fuel supply device which generates fuel gas to be supplied using a reformer, may also be used.

A fuel-gas circulation flow path 20b is connected to a fuel-electrode outlet of the fuel cell stack 10 at one end thereof. The other end of the fuel-gas circulation flow path 20b is connected to the fuel-gas supply path 20a. A fuel-gas circulating device 24 including a pump, a blower, etc., is placed in the fuel-gas circulation flow path 20b. The fuel-gas circulating device 24 operates so as to cause the fuel gas discharged from the fuel-electrode outlet of the fuel cell stack 10 to flow through the fuel-gas circulation flow path 20b, so that the fuel gas is supplied through the fuel-gas supply path 20a to the fuel electrode of each of the fuel cells 11 included in the fuel cell stack 10 again. Accordingly, an excess ratio (SRa) of the supply flow rate of the fuel gas can be increased. In place of the fuel-gas circulating device 24 including a pump, a blower, and the like, or in addition to the fuel-gas circulating device 24, an ejector for circulating the fuel gas may be disposed at a merging point of the fuel-gas circulation flow path 20b and the fuel-gas supply path 20a.

A fuel-gas discharge path 20c is connected to the fuel-electrode outlet of the fuel cell stack 10 such that the fuel-gas discharge path 20c branches from the fuel-gas circulation flow path 20b. A fuel-gas-outlet stop valve 25 is placed in the fuel-gas discharge path 20c. When the fuel-gas-outlet stop valve 25 is opened, impurities, such as nitrogen and argon, mixed in the fuel-gas circulation flow path 20b are discharged from the system through the fuel-gas discharge path 20c. A fuel-electrode-outlet pressure sensor 26 for measuring the pressure of the fuel gas at the fuel-electrode outlet of the fuel cell stack 10 is provided at a position near the branching point between the fuel-gas circulation flow path 20b and the fuel-gas discharge path 20c.

Figure 3:
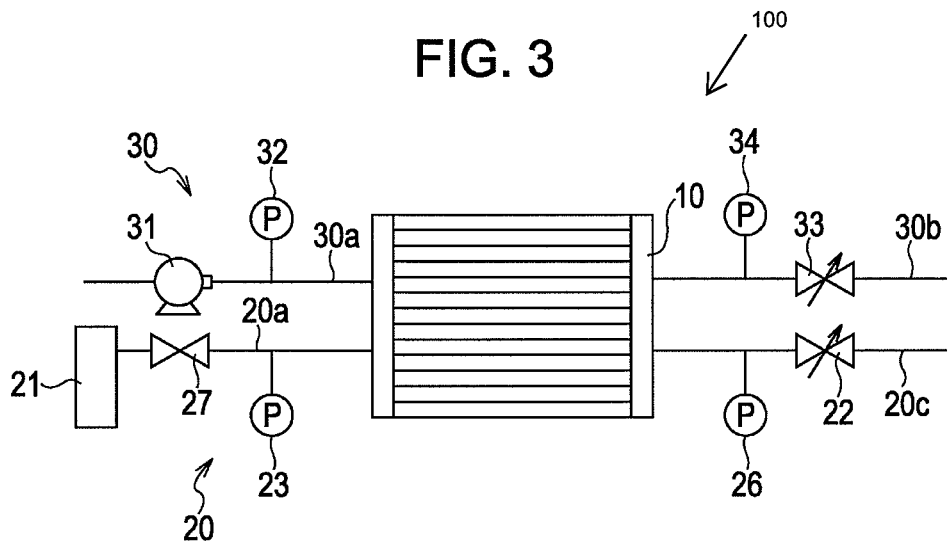
FIG. 3 is a diagram illustrating another example of a hydrogen system included in a fuel cell system.
Figure 4:
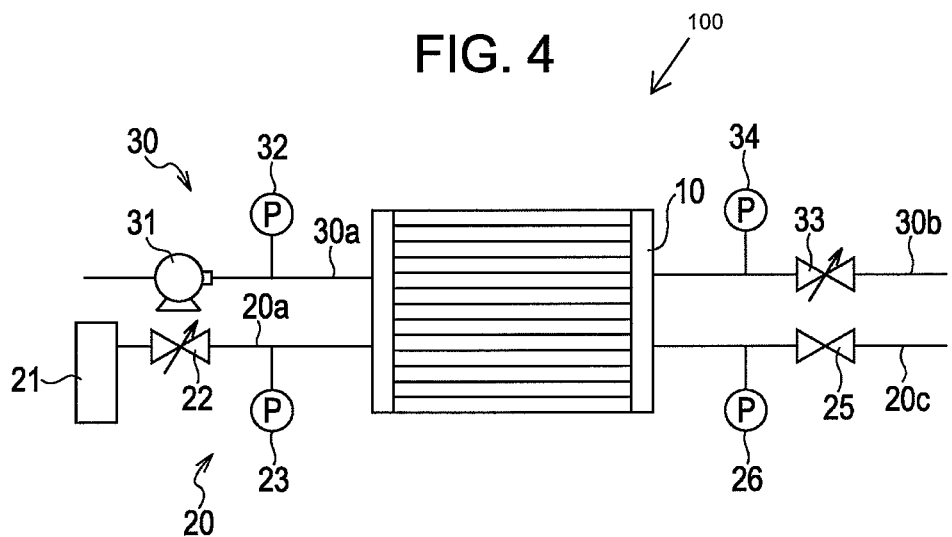
FIG. 4 is a diagram illustrating still another example of a hydrogen system included in a fuel cell system.

The structure of the hydrogen system 20 is not limited to the above-described circulating system in which the discharged fuel gas is circulated through the fuel-gas circulation flow path 20b. For example, as shown in FIG. 3, the fuel-gas circulation flow path 20b and the fuel-gas circulating device 24 may be omitted and the hydrogen system 20 may be formed as an open system in which a pressure reducing valve 27 is placed in the fuel-gas supply path 20a and a fuel-gas-pressure regulating valve 22 is placed in the fuel-gas discharge path 20c. Alternatively, as shown in FIG. 4, the fuel-gas circulation flow path 20b and the fuel-gas circulating device 24 may be omitted and the hydrogen system 20 may be formed as a closed system in which a fuel-gas-pressure regulating valve 22 is placed in the fuel-gas supply path 20a and a stop valve 25 is placed in the fuel-gas discharge path 20c.

The air system 30 includes, for example, an air compressor 31 which sucks in and pressurizes outside air. The air, which functions as the oxidizing gas, is supplied from the air compressor 31 to the oxidizing electrode of each of the fuel cells 11 included in the fuel cell stack 10 through an oxidizing-gas supply path 30a. An oxidizing-electrode-inlet pressure sensor 32 which measures the pressure of the oxidizing gas at an oxidizing-electrode inlet of the fuel cell stack 10 is placed in the oxidizing-gas supply path 30a.

An oxidizing-gas discharge path 30b is connected to the oxidizing-electrode outlet of the fuel cell stack 10. The oxidizing gas discharged from the fuel cell stack 10 is discharged from the system through the oxidizing-gas discharge path 30b. An oxidizing-gas-pressure regulating valve 33 and an oxidizing-electrode-outlet pressure sensor 34 are placed in the oxidizing-gas discharge path 30b. The oxidizing-gas-pressure regulating valve 33 regulates the pressure of the oxidizing gas supplied to the oxidizing electrode in each of the fuel cells 11. The oxidizing-electrode-outlet pressure sensor 34 measures the pressure of the oxidizing gas at the oxidizing-electrode outlet of the fuel cell stack 10.

The structure of the air system 30 is not limited to the above-described structure in which the pressure of the oxidizing gas is regulated by the oxidizing-gas-pressure regulating valve 33 disposed at the oxidizing-electrode outlet of the fuel cell stack 10. Although not shown in the figure, the oxidizing-gas-pressure regulating valve 33 may also be placed at the oxidizing-electrode inlet of the fuel cell stack 10 and the pressure of the oxidizing gas can be regulated by this oxidizing-gas-pressure regulating valve 33.

The controller 40 controls the overall operation of the fuel cell system 100 and includes, for example, a microcomputer having a CPU, a ROM, a RAM, and an input/output interface as main components. The controller 40 receives cell-voltage measurement values obtained by the above-described cell-voltage measuring devices 13. The controller 40 also receives detection values obtained by various sensors, such as the fuel-electrode-inlet pressure sensor 23 and the fuel-electrode-outlet pressure sensor 26 in the hydrogen system 20, the oxidizing-electrode-inlet pressure sensor 32 and the oxidizing-electrode-outlet pressure sensor 34 in the air system 30, etc., which are installed in the system. The controller 40 checks the operational state of the system 100 on the basis of the detection values obtained from the sensors, and controls the operations of the fuel-gas-pressure regulating valve 22, the fuel-gas circulating device 24, the fuel-gas-outlet stop valve 25, the air compressor 31, the oxidizing-gas-pressure regulating valve 33, and other components as required, so that desired electric power can be generated by the fuel cell stack 10. The controller 40 controls the operation of transmitting the electric power from the fuel cell stack 10 to the load device 12.

In addition, in the fuel cell system 100 according to the present embodiment, the controller 40 determines whether or not there is a leaking cell in the fuel cells 11 included in the fuel cell stack 10. In the leaking cell, gas flows through the solid polymer electrolyte membrane from the fuel-electrode side to the oxidizing-electrode side. Then, the controller 40 controls the operation of the system in accordance with whether or not the result of the determination indicates a leaking cell. The above-described process performed by the controller 40 is hereinafter referred to as a "leakage determination process."

First Embodiment

Leakage Determination Process

Figure 5:
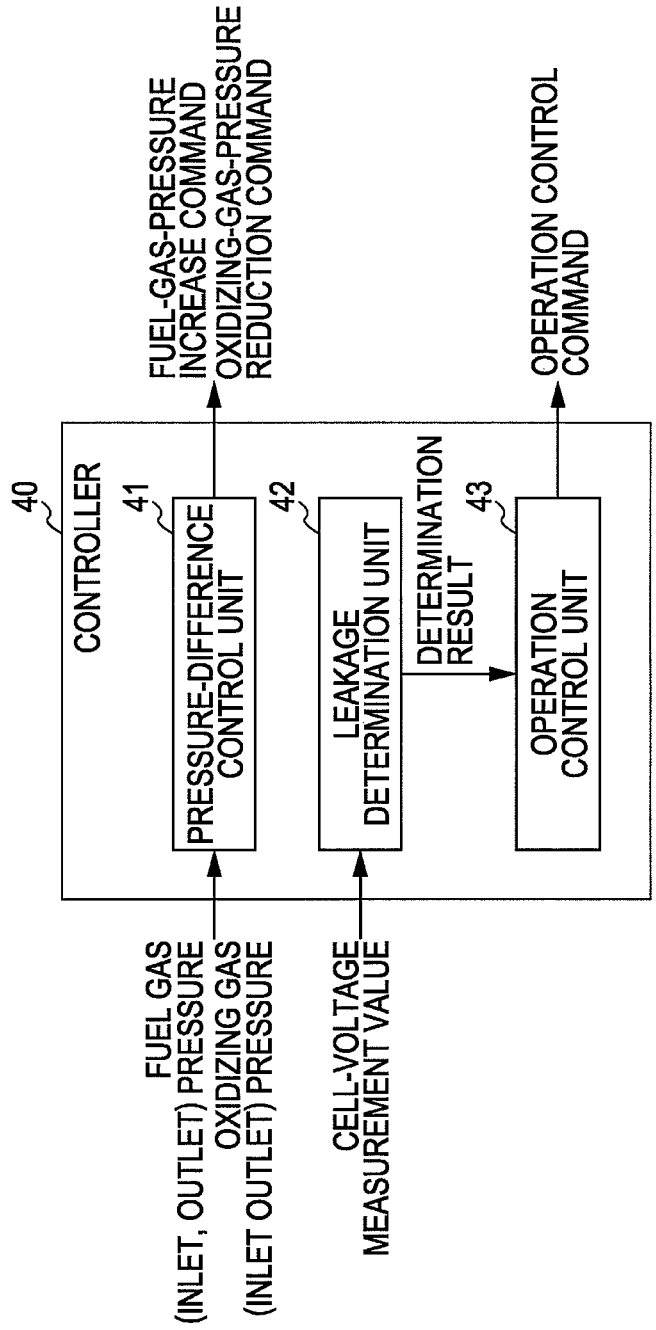
FIG. 5 is a functional block diagram illustrating the functional structure of a controller which relates to a leakage determination process.

FIG. 5 is a functional block diagram illustrating the functional structure of the controller 40 as it relates to the leakage determination process. As shown in FIG. 5, the controller 40 includes a pressure-difference control unit 41, a leakage determination unit 42, and an operation control unit 43. The pressure-difference control unit 41 generates a pressure difference between the fuel electrode and the oxidizing electrode in each of the fuel cells 11 in the fuel cell stack 10 such that the pressure at the fuel electrode is higher than that at the oxidizing electrode. In addition, the pressure-difference control unit 41 changes the pressure difference with time. The leakage determination unit 42 determines the presence or absence of the leaking cell on the basis of the behavior of the cell voltages measured by the cell-voltage measuring devices 13 while the pressure difference between the fuel electrode and the oxidizing electrode is being increased with time by the pressure-difference control unit 41. The operation control unit 43 controls the operation of the fuel cell system after the determination performed by the leakage determination unit 42 in accordance with the result of the determination. For example, if it is determined that a leaking cell is present, the operation of the system may be stopped.

Examples of pressure-difference control performed by the pressure-difference control unit 41 are shown in FIGS. 6A to 6D, and variations of the manner in which the pressure difference is increased are shown in FIGS. 7A to 7E.

When the controller 40 executes the leakage determination process, the pressure-difference control unit 41 first monitors the detection values obtained by the fuel-electrode-inlet pressure sensor 23 and the oxidizing-electrode-inlet pressure sensor 32 and determines whether or not the fuel gas pressure at the fuel-electrode inlet of the fuel cell stack 10 is substantially equal to the oxidizing gas pressure at the oxidizing-electrode inlet of the fuel cell stack 10. In the case where the fuel gas pressure at the fuel-electrode inlet and the oxidizing gas pressure at the oxidizing-electrode inlet are controlled to be equal to each other in a normal operational state, the leakage determination process may be started without performing the above-mentioned step. If there is a difference between the fuel gas pressure at the fuel-electrode inlet and the oxidizing gas pressure at the oxidizing-electrode inlet, the fuel gas pressure and the oxidizing gas pressure are made substantially equal to each other by adjusting the fuel gas pressure or the oxidizing gas pressure. The fuel gas pressure is adjusted by controlling the fuel-gas-pressure regulating valve 22, the fuel-gas circulating device 24, and the fuel-gas-outlet stop valve 25 in the hydrogen system 20. The oxidizing gas pressure is adjusted by controlling the air compressor 31 and the oxidizing-gas-pressure regulating valve 33 in the air system 30.

Next, the pressure-difference control unit 41 monitors the detection value of the fuel-electrode-inlet pressure sensor 23 or the detection value of the fuel-electrode-outlet pressure sensor 26 and determines whether or not the fuel gas pressure at the fuel-electrode inlet or the fuel-electrode outlet side of the fuel cell stack 10 is equal to or greater than a predetermined value P1 (fuel gas pressure threshold). The predetermined value P1 is set to a pressure corresponding to a maximum pressure difference P2 (target pressure difference) for when the pressure-difference control unit 41 increases the pressure difference with time in the leakage determination process. Thus, it can be determined whether or not it is possible to set the maximum pressure difference, that is, the target pressure difference between the fuel gas pressure and the oxidizing gas pressure. The predetermined value P1 is set to any value (for example, 50 kPa) below the maximum pressure difference that can be tolerated between the electrodes (i.e., the cell destruction limit).

Figure 6A:
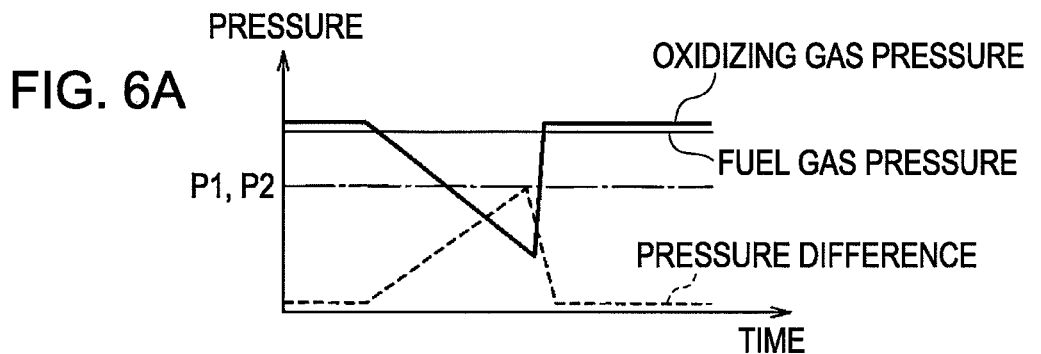
FIGS. 6A to 6D are graphs illustrating examples of pressure difference control performed by a pressure-difference control unit included in the controller.
Figure 7A:
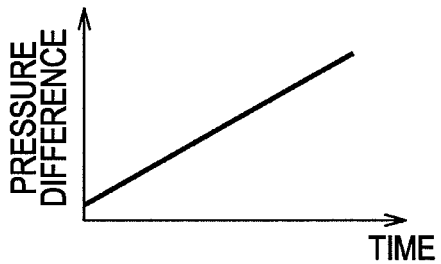
FIGS. 7A to 7E are graphs illustrating variations of the manner in which a pressure difference is monotonically increased by the pressure-difference control unit included in the controller.
Figure 7B:
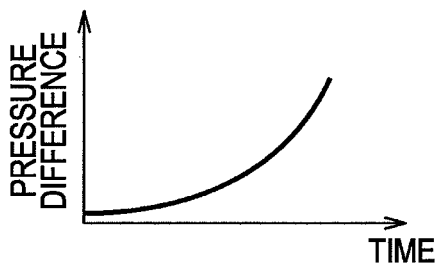
Figure 7C:
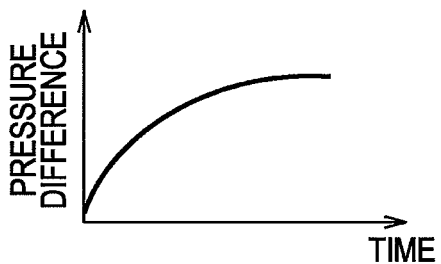
Figure 7D:
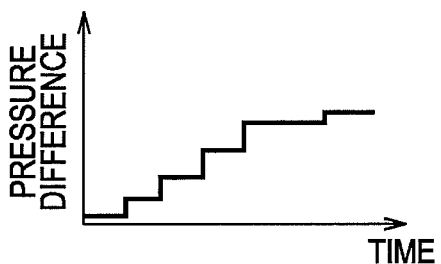
Figure 7E:
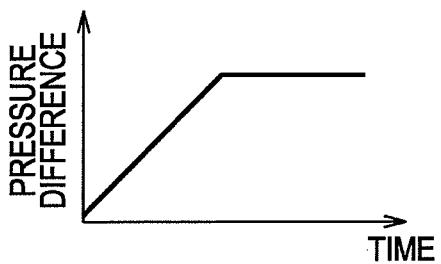

If the fuel gas pressure is equal to or greater than the predetermined value P1, as shown in FIG. 6A, the pressure-difference control unit 41 reduces the oxidizing gas pressure by controlling the air compressor 31 and the oxidizing-gas-pressure regulating valve 33 in the air system 30. Accordingly, a pressure difference is generated between the fuel electrode and the oxidizing electrode in each of the fuel cells 11 in the fuel cell stack 10 such that the pressure at the fuel electrode is higher than that at the oxidizing electrode. Then, the generated pressure difference is increased with time until the pressure difference reaches the pressure difference P2, which is the target pressure difference that corresponds to the predetermined value P1. The pressure difference may be increased in various manners. For example, the pressure difference may be increased along a linear line as shown in FIG. 7A or along a quadratic curve as shown in FIGS. 7B and 7C. Alternatively, the pressure difference may be increased stepwise as shown in FIG. 7D, or be increased linearly and then maintained at a certain value as shown in FIG. 7E.

Figure 6B:
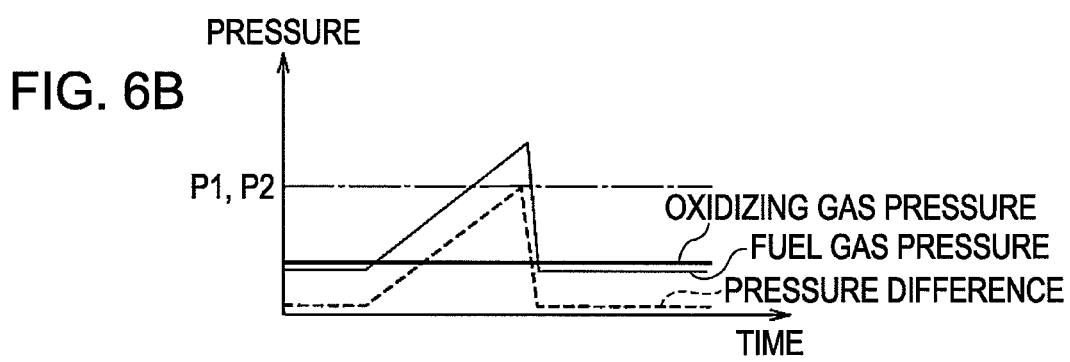

If the fuel gas pressure is less than the predetermined value P1, as shown in FIG. 6B, the pressure-difference control unit 41 increases the fuel gas pressure by controlling the fuel-gas-pressure regulating valve 22, the fuel-gas circulating device 24, and the fuel-gas-outlet stop valve 25 in the hydrogen system 20. Accordingly, a pressure difference is generated between the fuel electrode and the oxidizing electrode in each of the fuel cells 11 in the fuel cell stack 10 such that the pressure at the fuel electrode is higher than that at the oxidizing electrode. Then, the generated pressure difference is increased with time until the pressure difference reaches the above-described target pressure difference P2. Also in this case, the pressure difference may be monotonically increased in any of the various manners shown in FIGS. 7A to 7E.

Figure 6C:
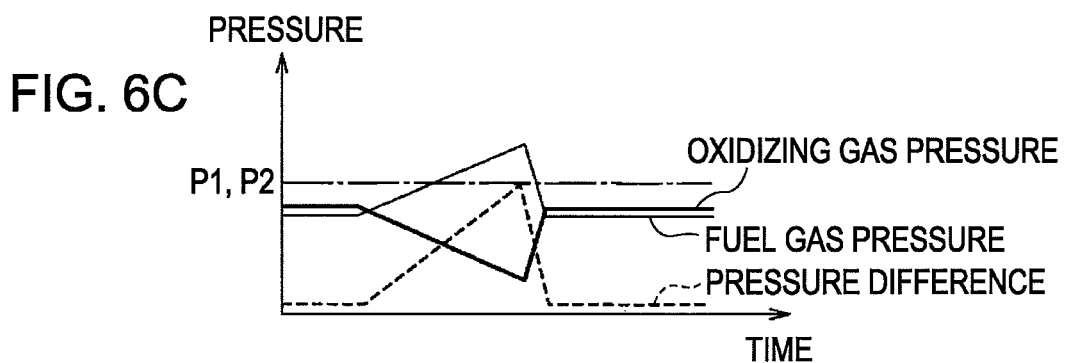
Figure 6D:
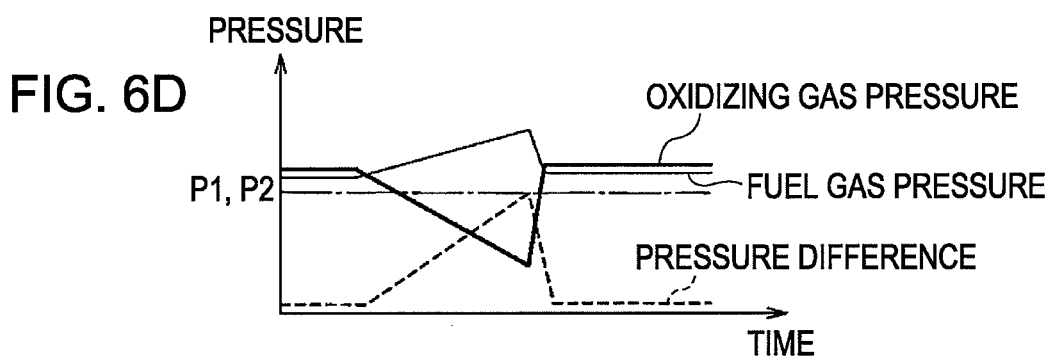

When the fuel gas pressure is less than the predetermined value P1 before the pressure difference is generated but the difference between the fuel gas pressure and the predetermined value P1 is small, the pressure-difference control unit 41 may increase the pressure difference between the fuel electrode and the oxidizing electrode in the manner shown in FIG. 6C. More specifically, the pressure difference between the fuel electrode and the oxidizing electrode in each of the fuel cells 11 in the fuel cell stack 10 may be increased by reducing the oxidizing gas pressure with time while increasing the fuel gas pressure with time by an amount corresponding to the difference from the predetermined value P1. In addition, when the fuel gas pressure is equal to or greater than the predetermined value P1 before the pressure difference is generated, the pressure-difference control unit 41 may increase the pressure difference between the fuel electrode and the oxidizing electrode in the manner shown in FIG. 6D. More specifically, the pressure difference between the fuel electrode and the oxidizing electrode in each of the fuel cells 11 in the fuel cell stack 10 may be increased by increasing the fuel gas pressure while reducing the oxidizing gas pressure.

FIGS. 8A to 8D are graphs illustrating methods by which the leakage determination unit 42 determines the presence or absence of a leaking cell.

Figure 8A:
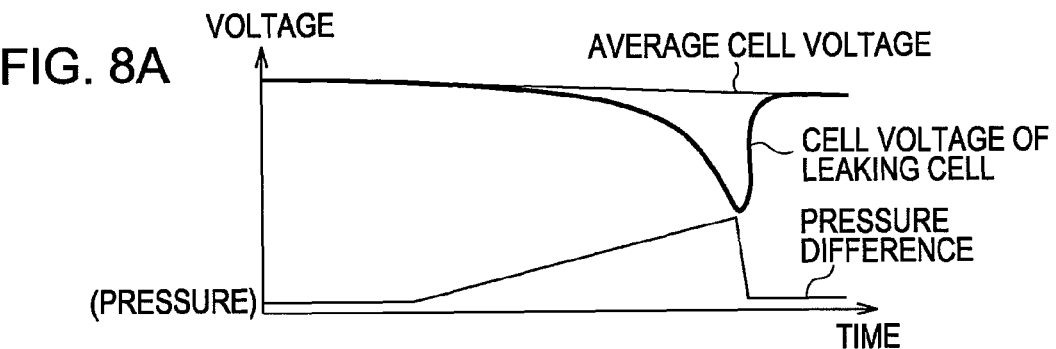
FIGS. 8A to 8D are graphs illustrating methods by which a leakage determination unit included in the controller determines the presence or absence of a leaking cell.
Figure 8B:
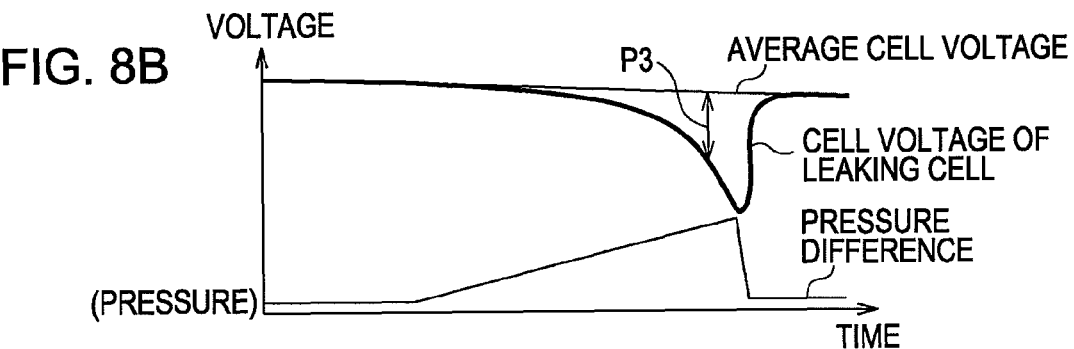

When the pressure difference between the fuel electrode and the oxidizing electrode in each of the fuel cells 11 in the fuel cell stack 10 is increased with time by the pressure-difference control unit 41, as shown in FIG. 8A, the average value (average cell voltage) of the cell voltages of the fuel cells 11 slightly decreases with time. If a leaking cell, in which gas flows through the solid polymer electrolyte membrane from the fuel-electrode side to the oxidizing-electrode side, is present in the fuel cells 11 in the fuel cell stack 10, the cell voltage of the leaking cell decreases by an amount considerably larger than the amount by which the average cell voltage decreases. This is because when the pressure difference between the fuel electrode and the oxidizing electrode is increased with time, the velocity of the fuel gas that flows from the fuel-electrode side to the oxidizing-electrode side increases in the leaking cell and the oxygen partial pressure at the oxidizing electrode rapidly decreases. As a result, the voltage decreases at an accelerated rate.

Accordingly, the leakage determination unit 42 monitors the cell voltages measured by the cell-voltage measuring devices 13 while the pressure difference between the fuel electrode and the oxidizing electrode in each fuel cell 11 is monotonically increased by the pressure-difference control unit 41. The leakage determination unit 42 determines the presence or absence of a leaking cell based on the behavior of the monitored cell voltages.

More specifically, the leakage determination unit 42 first determines the average cell voltage by calculating the sum of the cell voltages of the individual fuel cells 11 or the individual groups of fuel cells 11, as measured by the cell-voltage measuring devices 13, and dividing the sum of the cell voltages by the number of fuel cells 11 included in the fuel cell stack 10. The average cell voltage may also be calculated by dividing the voltage between the terminals of the fuel cell stack 10 by the number of fuel cells 11. The leakage determination unit 42 uses the average cell voltage as a reference and determines that a leaking cell is present if there is a fuel cell 11 or a group of fuel cells 11 whose cell voltage measured by the corresponding cell-voltage measuring device 13 is reduced by an amount larger than the amount by which the average cell voltage is reduced. For example, referring to FIG. 8B, while the pressure difference between the fuel electrode and the oxidizing electrode in each fuel cell 11 is increased by the pressure-difference control unit 41, the leakage determination unit 42 checks a voltage difference between the cell voltage measured by each cell-voltage measuring device 13 and the average cell voltage. If the voltage difference between the cell voltage measured by a certain cell-voltage measuring device 13 and the average cell voltage is equal to or greater than a predetermined value P3 (predetermined voltage difference threshold), the leakage determination unit 42 determines that the corresponding fuel cell 11 is a leaking cell or the corresponding group of fuel cells 11 includes a leaking cell. The predetermined value P3 is set to a value large enough to eliminate the influence of measurement errors and the like. For example, a value corresponding to 30% of the average cell voltage can be used. However, if the predetermined value P3 is too large, there is a risk that the polarity of the cell voltage of the leaking cell will change to negative before the system operation can be stopped in response to the determination of the presence of the leaking cell. In such a case, the system will be degraded due to the polarity inversion. Therefore, the predetermined value P3 is preferably set within a range such that the polarity of the cell voltage of the leaking cell can be prevented from changing to negative.

Figure 8C:
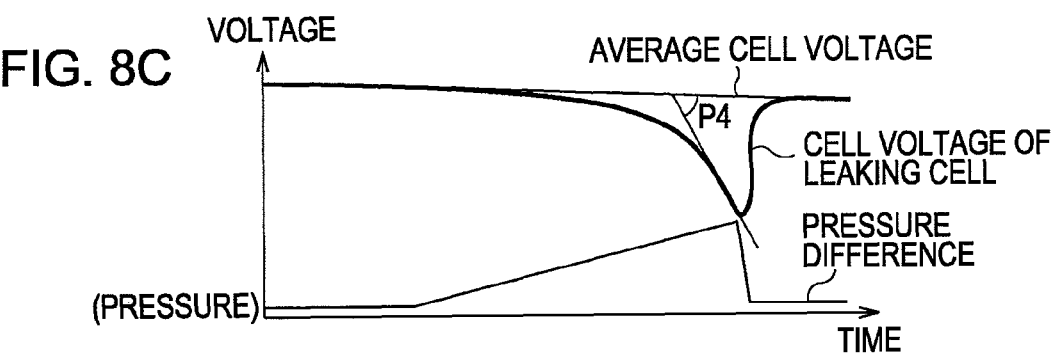

Alternatively, referring to FIG. 8C, while the pressure difference between the fuel electrode and the oxidizing electrode in each fuel cell 11 is increased with time by the pressure-difference control unit 41, the leakage determination unit 42 checks a difference between the reduction rate of the average cell voltage and the reduction rate of the cell voltage of each fuel cell 11 or each group of fuel cells 11. In other words, the leakage determination unit 42 checks a difference between the slope of the curve showing the average cell voltage and the slope of the curve showing the cell voltage of each fuel cell 11 or each group of fuel cells 11. If there is a fuel cell 11 or a group of fuel cells 11 for which the difference is equal to or greater than a predetermined value P4 (predetermined voltage reduction rate threshold), the leakage determination unit 42 determines that a leaking cell is present. Also in this case, the predetermined value P4 is preferably set to a value that is large enough to eliminate the influence of measurement errors and the like within a range such that the polarity of the cell voltage of the leaking cell can be prevented from changing to negative.

Figure 8D:
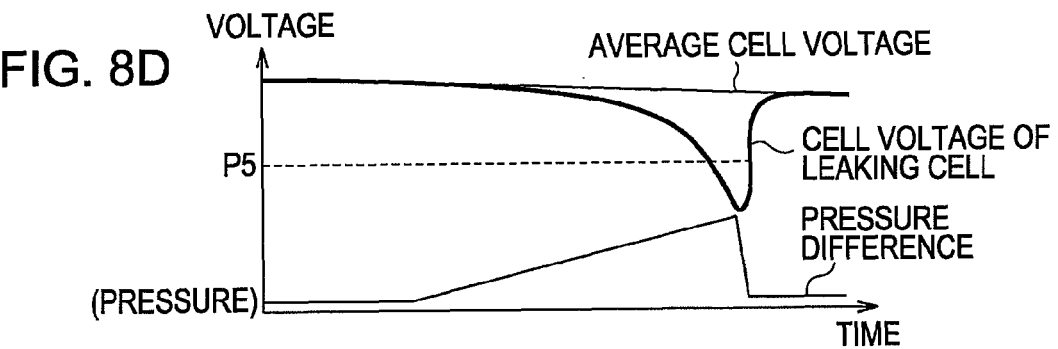

Alternatively, referring to FIG. 8D, while the pressure difference between the fuel electrode and the oxidizing electrode in each fuel cell 11 is increased with time by the pressure-difference control unit 41, the leakage determination unit 42 checks whether or not there is a fuel cell 11 or a group of fuel cells 11 whose cell voltage is reduced to a value equal to or less than a predetermined value P5 (predetermined voltage threshold). If there is a fuel cell 11 or a group of fuel cells 11 whose cell voltage is reduced to a value equal to or less than the predetermined value P5, the leakage determination unit 42 determines that a leaking cell is present. Also in this case, the predetermined value P5 is preferably set to a value that is large enough to eliminate the influence of measurement errors and the like (for example, a value corresponding to 70% of the average cell voltage) within a range such that the polarity of the cell voltage of the leaking cell can be prevented from changing to negative.

The result of the determination of the presence or absence of a leaking cell performed by the leakage determination unit 42 is transmitted to the operation control unit 43. If the leakage determination unit 42 determines that a leaking cell is present, the operation control unit 43 immediately stops the fuel-gas-pressure regulating valve 22 and the fuel-gas circulating device 24 in the hydrogen system 20 and the air compressor 31 in the air system 30. In addition, the operation control unit 43 causes the load device 12 to stop receiving the electric power from the fuel cell stack 10. Thus, the system operation is stopped. If the leakage determination unit 42 does not determine that a leaking cell is present before the pressure difference (which is being increased with time by the pressure-difference control unit 41) reaches the target pressure difference P2, the operation control unit 43 continues the system operation. More specifically, the fuel gas pressure and the oxidizing gas pressure are returned to pressures for normal operation (i.e., the design pressures determined from the load current and the operating temperature of the fuel cell stack 10).

However, there is a possibility that the power generation operation of the fuel cell stack 10 is in a transient stage in which various parameters including the fuel cell output (load current and cell voltages), the operating pressure, the fuel gas flow rate, the oxidizing gas flow rate, and the fuel cell operating temperature constantly vary. In such a case, when the determination of presence or absence of a leaking cell is performed by the above-described method, there is a risk that accurate determination will not result. More specifically, even if there is a fuel cell 11 or a group of fuel cells 11 whose cell voltage decreases by a large amount, the cause of reduction in the cell voltage is not always a leaking cell. The reduction in the cell voltage may be due to other causes, such as flooding or drying. In particular, it has been found that when the oxidizing gas pressure is reduced, the water content in the fuel cell stack 10 decreases and the fuel cell stack 10 tends to dry. Therefore, it is possible that the reduction in the cell voltage is caused by drying of the fuel cell stack 10.

Figure 9A:
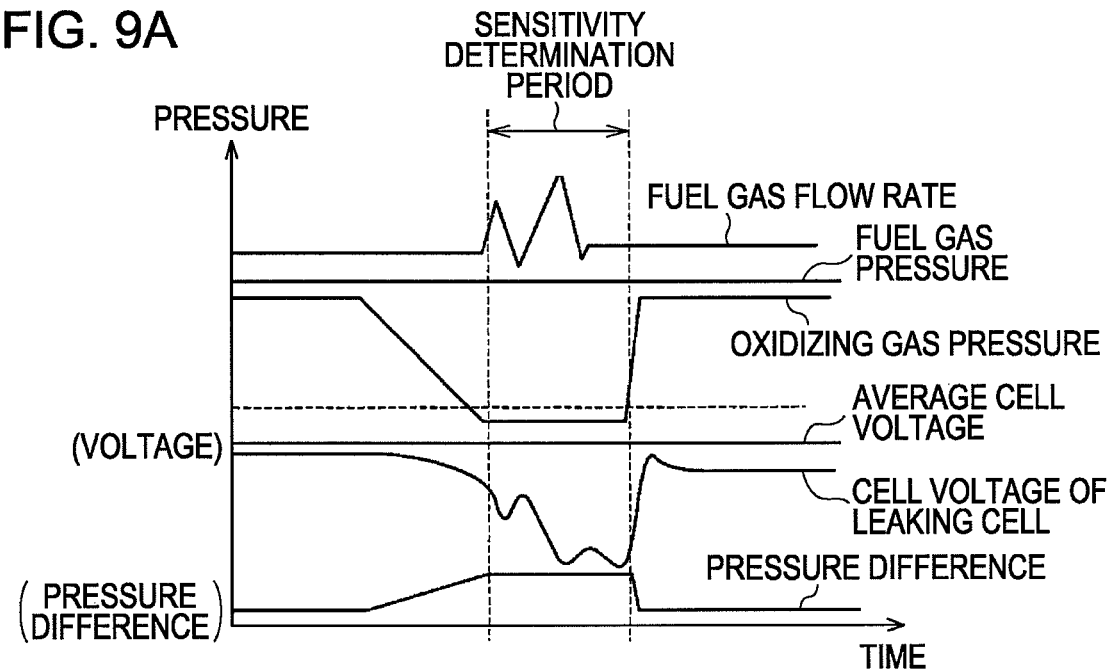
FIGS. 9A and 9B are graphs illustrating other methods by which the leakage determination unit included in the controller determines the presence or absence of a leaking cell.

The accuracy of the determination of presence or absence of a leaking cell can be increased by performing the following process. Referring to FIG. 9A, which relates to the case in which a fuel cell 11 or a group of fuel cells 11 is suspected to be or include a leaking cell is detected from the behavior of the cell voltages while the pressure difference is monotonically increased. In this case, the pressure difference is maintained constant for a predetermined period (the period indicated as "sensitivity determination period" in FIG. 9A). In the sensitivity determination period, the flow rate of the fuel gas supplied to the fuel cell stack 10 is varied within a predetermined range. If the cell voltage of the fuel cell 11 or the group of fuel cells 11 suspected to be or include a leaking cell varies in accordance with the variation in the supply flow rate of the fuel gas (i.e., if sensitivity is observed), it is determined that a leaking cell is present. If the power generation operation of the fuel cell stack 10 is in a transient stage and the fuel gas is supplied at an excess flow rate that is higher than the required flow rate determined from the load current of the fuel cell stack 10, unless there is a leaking cell, the cell voltage does not vary in accordance with the variation in the flow rate of the fuel gas. Therefore, if there is a fuel cell 11 or a group of fuel cells 11 whose cell voltage varies in accordance with the variation in the flow rate of the fuel gas when the load is unchanged, it can be determined that a leaking cell is present.

Thus, the accuracy of the determination of presence or absence of a leaking cell can be increased.

Figure 9B:
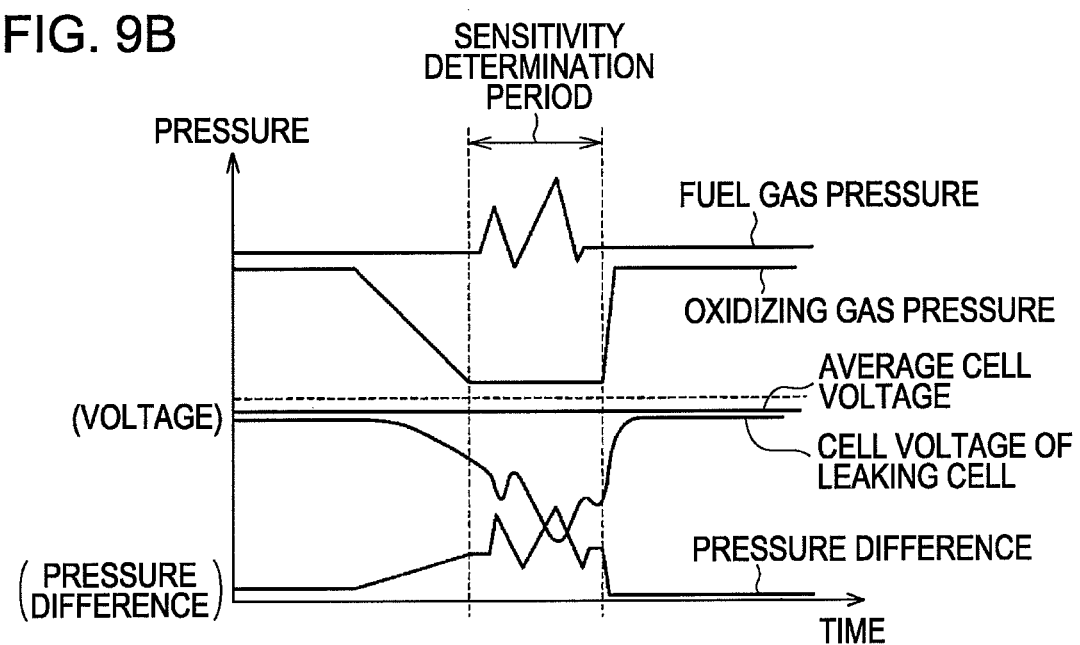

Alternatively, as shown in FIG. 9B, if a fuel cell 11 or a group of fuel cells 11 that is suspected to be or include a leaking cell, as detected from the behavior of the cell voltages while the pressure difference is increased with time at a certain rate, the oxidizing gas pressure may be maintained constant for a predetermined period (the period indicated as "sensitivity determination period" in FIG. 9B). In the sensitivity determination period, the pressure of the fuel gas supplied to the fuel cell stack 10 is varied within a predetermined range. If the cell voltage of the fuel cell 11 or the group of fuel cells 11 suspected to be or include a leaking cell varies in accordance with the variation in the fuel gas pressure (i.e., if sensitivity is observed), it is determined that a leaking cell is present. If the power generation operation of the fuel cell stack 10 is in a transient stage and the fuel gas is supplied at an excess flow rate that is higher than the required flow rate determined from the load current of the fuel cell stack 10, unless there is a leaking cell, the cell voltage does not vary in accordance with the variation in the fuel gas pressure. Therefore, if there is a fuel cell 11 or a group of fuel cells 11 whose cell voltage varies in accordance with the variation in the fuel gas pressure, it can be determined that a leaking cell is present. Thus, the accuracy of determination of the presence or absence of a leaking cell can be increased.

FIG. 10 is a flowchart illustrating an example of the leakage determination process performed by the controller 40. The leakage determination process shown in FIG. 10 is repeatedly executed at a predetermined time interval, or is executed when the operational state changes to a certain state, such as an idling state.

When the process flow shown in FIG. 10 is started in step S1, the controller 40 checks whether or not the pressures of the fuel gas and the oxidizing gas supplied to the fuel cell stack 10 are substantially equal to each other (for example, whether or not the pressure difference is 10 KPa or less). If the fuel gas pressure and the oxidizing gas pressure are not substantially equal to each other, the process proceeds to step S2, where one or both of the fuel gas pressure and the oxidizing gas pressure is adjusted so as to make the fuel gas pressure and the oxidizing gas pressure substantially equal to each other.

Next, in step S3, the controller 40 determines whether or not the fuel gas pressure is equal to or greater than the predetermined value P1. If the fuel gas pressure is equal to or greater than the predetermined value P1, the process proceeds to step S4, where the oxidizing gas pressure is reduced. Accordingly, a pressure difference is generated between the fuel electrode and the oxidizing electrode in each of the fuel cells 11 included in the fuel cell stack 10 such that the pressure at the fuel electrode is higher than the pressure at the oxidizing electrode. Then, the pressure difference is increased with time. If it is determined that the fuel gas pressure is less than the predetermined value P1 in step S3, the process proceeds to step S5, where the fuel gas pressure is increased. Accordingly, a pressure difference is generated between the fuel electrode and the oxidizing electrode in each of the fuel cells 1 included in the fuel cell stack 10 such that the pressure at the fuel electrode is higher than the pressure at the oxidizing electrode. Then, the pressure difference is increased with time.

Then, in step S6, the controller 40 monitors the cell voltages while the pressure difference between the fuel electrode and the oxidizing electrode in each fuel cell 11 is monotonically increased with time. Based on the behavior of the monitored cell voltages, it is determined whether or not there is a leaking cell, i.e., a cell in which gas flows through the solid polymer electrolyte membrane from the fuel-electrode side to the oxidizing-electrode side, in the fuel cells 11 included in the fuel cell stack 10. More specifically, the controller 40 checks the monitored cell voltages and determines whether or not there is a fuel cell 11 or a group of fuel cells 11 for which the difference between the average cell voltage and the monitored cell voltage is equal to or greater than the predetermined value P3. Alternatively, the controller 40 determines whether or not there is a fuel cell 11 or a group of fuel cells 11 for which the difference between the reduction rate of the average cell voltage and the reduction rate of the monitored cell voltage, that is, the difference between the slope of the curve showing the average cell voltage and the slope of the curve showing the monitored cell voltage, is equal to or greater than a predetermined value P4. Alternatively, the controller 40 determines whether or not there is a fuel cell 11 or a group of fuel cells 11 whose cell voltage is reduced to a value equal to or less than the predetermined value P5.

The pressure difference between the fuel gas pressure and the oxidizing gas pressure is continuously increased with time until the pressure difference reaches the target pressure difference P2. If it is determined that a leaking cell is present before the pressure difference reaches the target pressure difference P2 (Yes in step S6), the controller 40 stops the system operation immediately in step S7. If the pressure difference reaches the target pressure difference P2 without the determination that a leaking cell is present (No in step S6 and Yes in step S8), the controller 40 continues the system operation by returning the fuel gas pressure and the oxidizing gas pressure to the pressures for normal operation in step S9.

Advantages of Embodiment

As described in detail above, according to the fuel cell system of the present embodiment, the controller 40 monitors cell voltages while the pressure difference between the fuel electrode and the oxidizing electrode is increased with time in each of the fuel cells 11 included in the fuel cell stack 10. The controller 40 determines the presence or absence of a leaking cell based on the behavior of the monitored cell voltages. Therefore, the presence or absence of a leaking cell can be accurately determined in a short time. The present embodiment represents an improvement over the prior art systems, in which the presence or absence of a leaking cell is determined based on the behavior of cell voltages while the pressure difference is maintained constant. In particular, the following problems occur in the prior art process. When the pressure difference is maintained constant, the velocity of gas that flows from the fuel-electrode side to the oxidizing-electrode side in the leaking cell is constant. Therefore, when, for example, the leakage is caused by a very small hole in the solid polymer electrolyte membrane, it takes a long time for the cell voltage to be reduced enough to allow the leakage to be detected. Thus, it is difficult to determine the presence or absence of a leaking cell in a short time. In comparison, in the fuel cell system according to the present embodiment, the presence or absence of a leaking cell is determined based on the behavior of cell voltages while the pressure difference is increased with time. Therefore, the velocity of gas that flows from the fuel-electrode side to the oxidizing-electrode side in the leaking cell increases with time in the leaking cell. As a result, the oxygen partial pressure at the oxidizing-electrode side decreases in a short time and the voltage decreases at an accelerated rate in the leaking cell. Therefore, the presence or absence of a leaking cell can be determined with high accuracy in a short time.

In addition, according to the fuel cell system of the present embodiment, the controller 40 determines the presence or absence of a leaking cell while the pressure difference is increased. If it is determined that the leaking cell is present, the system operation is stopped immediately. Therefore, if a leaking cell is present, the leaking cell can be detected at a minimum necessary pressure difference corresponding to the state (seriousness) of the leakage, and various problems which occur if the pressure difference is excessively high can be effectively avoided. For example, if the pressure difference is excessively high, there is a problem that the fuel cell 11 will be degraded and the hole size will be increased due to heat generated by combustion reaction between the fuel gas that flows to the oxidizing-electrode side and the oxidizing gas at the oxidizing-electrode side.

In addition, according to the fuel cell system of the present embodiment, if the fuel gas pressure before the pressure difference is generated is equal to or greater than predetermined value P1, the controller 40 increases the pressure difference with time by reducing the oxidizing gas pressure. If the fuel gas pressure before the pressure difference is generated is less than predetermined value P1, the controller 40 increases the pressure difference with time by increasing the fuel gas pressure. Therefore, energy loss which occurs when the pressure difference is increased can be minimized. If the pressure difference is increased with time by reducing the oxidizing gas pressure and increasing the fuel gas pressure, the pressure difference can be increased in a short time. Therefore, the time required for the leakage determination can be further reduced.

In addition, the pressure difference is controlled such that a relatively large pressure difference is not applied immediately at the time when the determination process is started. Therefore, the pressure difference can be prevented from exceeding the pressure difference between the electrodes at the cell destruction limit, and the solid polymer electrolyte membrane can be prevented from undergoing a sudden change.

In addition, according to the fuel cell system of the present embodiment, the controller 40 determines that a leaking cell is present if there is a fuel cell 11 or a group of fuel cells 11 for which the difference between the average cell voltage and the monitored cell voltage becomes equal to or greater than the predetermined value P3 while the pressure difference is being increased. Alternatively, the controller 40 determines that a leaking cell is present if there is a fuel cell 11 or a group of fuel cells 11 for which the difference between the reduction rate of the average cell voltage and the reduction rate of the monitored cell voltage becomes equal to or greater than the predetermined value P4 while the pressure difference is being increased. Therefore, even if the average cell voltage varies due to load variation or the like, the controller 40 can be effectively prevented from determining that a normal fuel cell 11 is a leaking cell by mistake. Thus, the presence or absence of a leaking cell can be accurately determined. The controller 40 may also determine that a leaking cell is present if there is a fuel cell 11 or a group of fuel cells 11 whose cell voltage becomes equal to or less than the predetermined value P5 while the pressure difference is being increased with time. In such a case, the presence or absence of a leaking cell can be easily determined.

Second Embodiment

A second embodiment of the present invention will now be described. According to the present embodiment, the timing at which the leakage determination process is performed by the controller 40 is optimized. The structure and operation of the fuel cell system according to the present embodiment are similar to those of the first embodiment. Therefore, only the characteristic parts of the present embodiment will be described below, and explanations similar to those of the first embodiment will be omitted.

In the fuel cell system according to the present embodiment, the controller 40 performs the leakage determination process in an activation overvoltage region.

Figure 11:
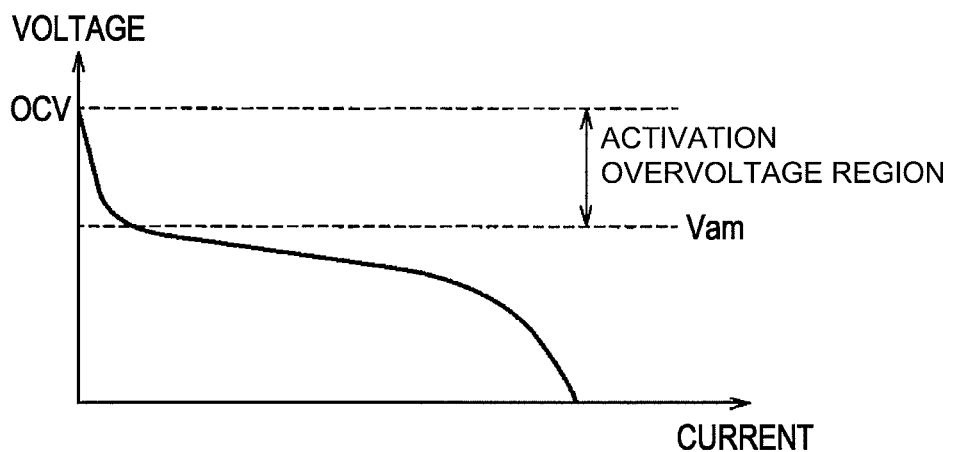
FIG. 11 is a characteristic diagram illustrating the relationship between the current and the voltage in each fuel cell included in the fuel cell stack.

FIG. 11 is a characteristic diagram illustrating the relationship between the current and voltage in each of the fuel cells 11 included in the fuel cell stack 10. The slope of the current-voltage curve is termed the Tafel slope. In the state in which the fuel gas is supplied to the fuel electrode and the oxidizing gas is supplied to the oxidizing electrode, the maximum cell voltage of each fuel cell 11 is equal to an open-circuit voltage (OCV), that is, a voltage obtained when no current is transmitted to the load device 12. The open-circuit voltage (OCV) can be determined in advance by experiment or simulation based on the conditions, such as temperature, pressure, and humidity, of the reaction gases (fuel gas and oxidizing gas) supplied to each fuel cell 11 and the characteristics (for example, hydrogen permeability of the solid polymer electrolyte membrane) of each fuel cell 11.

As the amount of current output from each fuel cell 11 is increased, the cell voltage tends to decrease. More specifically, when the process of outputting the current from each fuel cell 11 is started and the amount of output current is gradually increased, first, the cell voltage rapidly decreases from the OCV. Then, if the amount of output current is further increased, the voltage reduction rate decreases and then becomes relatively constant at a relatively low rate even when the amount of output current continues to be increased. Then, if the amount of current output from each fuel cell 11 is further increased, the voltage reduction rate increases again as the amount of output current increases.

In the above-described transition of the cell voltage, the range in which the voltage rapidly decreases immediately after the process of outputting current is started is generally called the activation overvoltage region. The lower limit Vam of the activation overvoltage region can be determined by experiment or simulation based on the state of the supplied reaction gases and the characteristics of the fuel cells 11. The upper limit of the activation overvoltage region is the open-circuit voltage (OCV). Here, it is assumed that the open-circuit voltage (OCV) is included in the activation overvoltage region.

As described above, in the activation overvoltage region, the cell voltage of each fuel cell 11 rapidly decreases as the amount of current output from the fuel cell 11 increases. In a leaking cell, when the velocity of the fuel gas that flows from the fuel-electrode side to the oxidizing-electrode side increases, the fuel cell voltage responds as if the amount of the output current is increased. As a result, the cell voltage rapidly decreases. Therefore, if the leakage determination process is performed while the cell voltage is in the activation overvoltage region, the determination of presence or absence of a leaking cell can be performed in a shorter time. In particular, within the activation overvoltage region, the leakage determination process may be performed in a specific range which includes the open-circuit voltage (OCV) and in which the Tafel slope is linear (i.e., the steeply sloped range in which the voltage variation is linear in the characteristic diagram shown FIG. 11 when the horizontal axis represents the logarithm of current density and the vertical axis represents the voltage). In other words, the leakage determination process may be performed in the current density range in which sufficient reaction gas is supplied to the reaction surface of each fuel cell 11 and the influence of diffusion polarization can be eliminated. In such a case, it can be determined that the reason for voltage reduction is the leakage and the determination accuracy can be further increased.

Therefore, in the fuel cell system according to the present embodiment, the controller 40 performs the leakage determination process while the cell voltages of the fuel cells 11 measured by the cell-voltage measuring devices 13 are in the activation overvoltage region, in particular, in the range which includes the open-circuit voltage (OCV) and in which the Tafel slope is linear.

More specifically, first, the controller 40 confirms that the cell voltages measured by the cell-voltage measuring devices 13 are in the activation overvoltage region, in particular, in the range which includes the open-circuit voltage (OCV) and in which the Tafel slope is linear. Then, the flow rate of the oxidizing gas supplied to the oxidizing electrode in each fuel cell 11 is reduced to below the flow rate in normal operation (i.e., the design flow rate which is specific to the system and which is determined from the load current and the operating temperature of the fuel cell stack 10). Alternatively, the supply of the oxidizing gas is stopped. At this time, the current produced by the fuel cell stack 10 may be output to a load to reduce the oxygen partial pressure at the oxidizing electrode.

Whether or not the cell voltages are in the activation overvoltage region and in the range in which the Tafel slope is linear can be determined by monitoring the cell voltages and the current in real time. Alternatively, a predetermined current density (for example, 0.1 A/m2) obtained from experiment may be used as a threshold to simplify the determination process.

Next, the controller 40 causes the pressure-difference control unit 41 to generate a pressure difference between the fuel electrode and the oxidizing electrode in each fuel cell 11 while the flow rate of the oxidizing gas is reduced or the supply of the oxidizing gas is stopped as described above. Then, the pressure difference is increased with time. While the pressure difference is being increased, the leakage determination unit 42 determines the presence or absence of a leaking cell by the method described in the first embodiment. If a leaking cell is present, the system operation is stopped. If there is no leaking cell, the system operation is continued.

Thus, in the fuel cell system according to the present embodiment, the controller 40 performs the leakage determination process while the cell voltages of the fuel cells 11 measured by the cell-voltage measuring devices 13 are in the activation overvoltage region, in particular, in the range which includes the open-circuit voltage (OCV) and the region in which the Tafel slope is linear. Therefore, the presence or absence of a leaking cell can be accurately determined.

In addition, in the fuel cell system according to the present embodiment, the flow rate of the oxidizing gas supplied to each of the fuel cells 11 in the fuel cell stack 10 is reduced to below the flow rate in normal operation, or the supply of the oxidizing gas is stopped. The leakage determination process is performed while the oxygen partial pressure at the oxidizing electrode is reduced in each fuel cell 11. Therefore, the presence or absence of a leaking cell can be determined in a short time and the energy loss due to the supply of the oxidizing gas can be reduced. Thus, the presence or absence of a leaking cell can be effectively determined.

Third Embodiment

A third embodiment of the present invention will now be described. According to the third embodiment, in the leakage determination process performed by the controller 40, the operation control unit 43 controls the system operation in response to the result of determination obtained by the leakage determination unit 42 in a manner different from that in the first embodiment. More specifically, in the fuel cell system according to the first embodiment, if the leakage determination unit 42 determines that a leaking cell is present, the operation control unit 43 immediately stops the system operation. In comparison, in the fuel cell system of the present embodiment, if the leakage determination unit 42 determines that a leaking cell is present, the operation control unit 43 checks whether or not the pressure difference at the time of determination of the presence of a leaking cell is within an allowable pressure difference range permitted in normal operation i.e., a range in which the pressure difference between the fuel gas supply pressure and the oxidizing gas supply pressure is permitted to be during normal operation. If the pressure difference at the time of determination of the presence of a leaking cell is within the allowable pressure difference range, the system operation is stopped. If the pressure difference is outside the allowable pressure difference range, that is, if the pressure difference is larger than the pressure difference assumed in the normal operation, the system operation is continued. The structure and operation of the fuel gas system according to the present embodiment are similar to those of the first embodiment. Therefore, only the characteristic parts of the present embodiment will be described below, and explanations similar to those of the first embodiment will be omitted.

Figure 12:
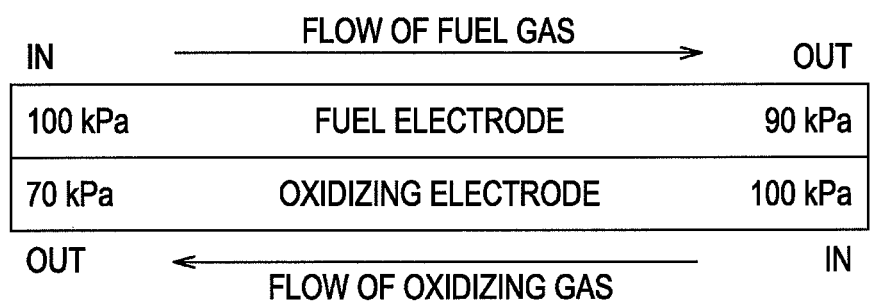
FIG. 12 is a schematic diagram illustrating an example of a pressure distribution at a fuel electrode and an oxidizing electrode in a fuel cell.

FIG. 12 is a schematic diagram illustrating an example of a pressure distribution at the fuel electrode and the oxidizing electrode in each fuel cell 11. The fuel cell 11 shown in FIG. 12 has a counter-flow structure in which the direction in which the fuel gas flows in the fuel cell 11 and the direction in which the oxidizing gas in the fuel cell 11 are opposite to each other. Even if, for example, the fuel gas and the oxidizing gas are both supplied at 100 kPa, a pressure difference of, for example, 30 kPa occurs at the inlet of the fuel gas (outlet of the oxidizing gas) and a pressure difference of, for example, 10 kPa occurs at the inlet of the oxidizing gas (outlet of the fuel gas), due to the pressure loss between the gas inlet and outlet. Thus, in the fuel cell system, it is difficult in practice to completely eliminate the pressure difference between the fuel electrode and the oxidizing electrode in each fuel cell 11. During normal operation, a pressure difference within a certain range is allowed and the pressures of the fuel gas and the oxidizing gas are controlled such that the pressure difference therebetween does not exceed the allowable pressure difference range.

Therefore, even when it is determined that a leaking cell is present in the leakage determination process, if the pressure difference between the fuel electrode and the oxidizing electrode in each fuel cell 11 at the time of the determination is outside the allowable pressure difference range, no gas flow occurs across the membrane in the leaking cell during normal operation. In other words, if the pressure difference that is large enough to cause the fuel gas to flow from the fuel-electrode side to the oxidizing-electrode side in the leaking cell is outside the allowable pressure difference range, no gas flow through the membrane occurs in the leaking cell during normal operation. Therefore, no problem occurs even if the system operation is continued within the allowable pressure difference range.

Therefore, in the fuel cell system according to the present embodiment, if the controller 40 determines that a leaking cell is present in the leakage determination process, it is determined whether or not the pressure difference between the fuel electrode and the oxidizing electrode in each fuel cell 11 at the time of the determination is within the allowable pressure difference range permitted in normal operation. If the pressure difference is within the allowable pressure difference range, the system operation is stopped. If the pressure difference is outside the allowable pressure difference range, the system operation is continued.

More specifically, similar to the first embodiment, the controller 40 causes the leakage determination unit 42 to determine the presence or absence of a leaking cell based on the behavior of the cell voltages while the pressure-difference control unit 41 increases the pressure difference with time. In the present embodiment, when the leakage determination unit 42 determines that a leaking cell is present, the operation control unit 43 determines the pressure difference from, for example, the detection values obtained by the fuel-electrode-inlet pressure sensor 23 and the oxidizing-electrode-inlet pressure sensor 32. Then, the thus-determined pressure difference is compared with the predetermined allowable pressure difference range for normal operation, and it is determined whether the pressure difference at the time of determination of the presence of a leaking cell is within the allowable pressure difference range or outside the allowable pressure difference range. Then, if the pressure difference at the time of determination of the presence of a leaking cell is within the allowable pressure difference range, the operation control unit 43 immediately stops the system operation. If the pressure difference at the time of determination of the presence of a leaking cell is outside the allowable pressure difference range, the operation control unit 43 continues the system operation by returning the fuel gas pressure and the oxidizing gas pressure to the pressures for normal operation.

Figure 13:
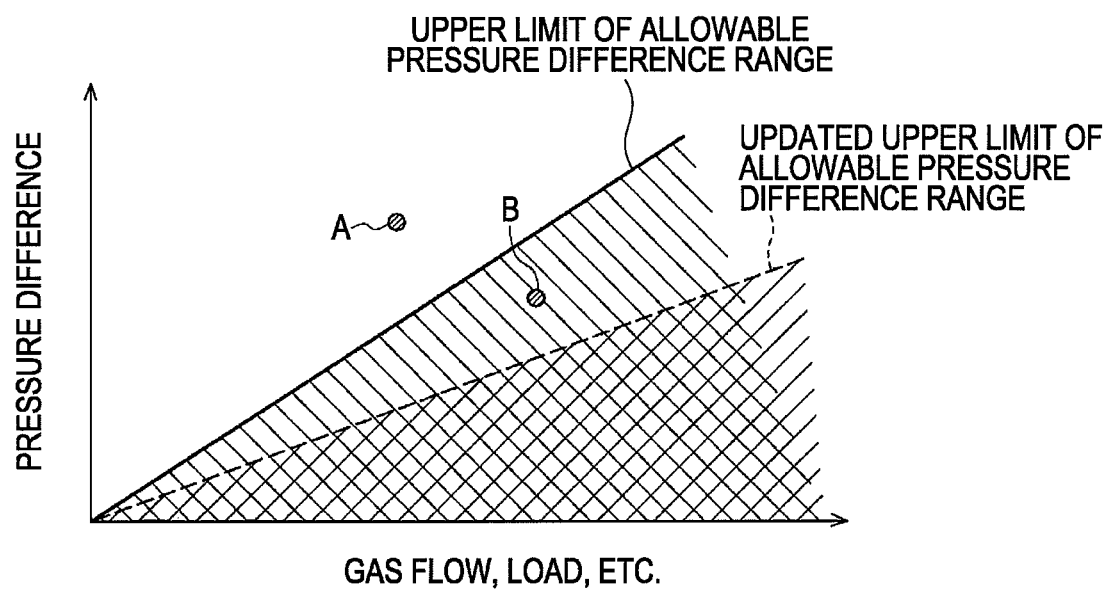
FIG. 13 is a graph illustrating the relationship between the result of determination of presence or absence of a leaking cell and the allowable pressure difference ranges of operation of a fuel cell.

FIG. 13. shows the relationship between the result of the determination of presence or absence of a leaking cell and the system operation control performed after the determination in the fuel cell system according to the present embodiment.

In the fuel cell system according to the present embodiment, if the controller 40 determines that a leaking cell is present in the leakage determination process, it is determined whether or not the pressure difference between the fuel electrode and the oxidizing electrode in each fuel cell 11 at that time is within the allowable pressure difference range permitted in normal operation. If the pressure difference is outside the allowable pressure difference range (for example, point A in FIG. 13), the system operation is continued at the allowable pressure difference range. If the pressure difference at the time of determination of the presence of a leaking cell is within the allowable pressure difference range (for example, point B in FIG. 13), the system operation is stopped.

As described above, in the fuel cell system according to the present embodiment, if the controller 40 determines that a leaking cell is present in the leakage determination process, it is determined whether the pressure difference at the time of determination of the presence of a leaking cell is within the allowable pressure difference range permitted in normal operation. The system operation is stopped only when the pressure difference is within the allowable pressure difference range, and is continued when the pressure difference is outside the allowable pressure difference range. Therefore, the system operation can be effectively prevented from being stopped when it is not necessary to stop the system operation.

Fourth Embodiment

A fourth embodiment of the present invention will now be described. The fourth embodiment is a modification of the above-described third embodiment. In the fuel cell system according to the third embodiment, if the leakage determination unit 42 determines that a leaking cell is present, the operation control unit 43 checks whether or not the pressure difference at the time of determination of the presence of a leaking cell is within an allowable pressure difference range permitted in normal operation, i.e., a range in which the pressure difference between the fuel gas supply pressure and the oxidizing gas supply pressure is permitted to be during normal operation. In the third embodiment, if the pressure difference is within the allowable pressure difference range, the system operation is stopped. In comparison, in the fuel cell system according to the present embodiment, if the pressure difference at the time of determination of the presence of a leaking cell is within the allowable pressure difference range, the system operation is continued after updating the allowable pressure difference range permitted in normal operation to a range smaller than the pressure difference at the time of determination of the presence of a leaking cell. The structure and operation of the fuel gas system according to the present embodiment are similar to those of the first embodiment. Therefore, only the characteristic parts of the present embodiment will be described below, and explanations similar to those of the first embodiment will be omitted.

FIG. 13 is a graph illustrating the relationship between the result of the determination of presence or absence of a leaking cell and the system operation control performed after the determination in the fuel cell system according to the present embodiment. In the fuel cell system according to the present embodiment, if the controller 40 determines that a leaking cell is present in the leakage determination process, it is determined whether or not the pressure difference between the fuel electrode and the oxidizing electrode in each fuel cell 11 at that time is within the allowable pressure difference range permitted in normal operation. If the pressure difference is outside the allowable pressure difference range (for example, point A in FIG. 13), the system operation is continued. If the pressure difference at the time of determination of the presence of a leaking cell is within the allowable pressure difference range (for example, point B in FIG. 13), the system operation is continued after updating the allowable pressure difference range to a range smaller than the pressure difference at the time of determination of the presence of a leaking cell (range below the dashed line in FIG. 13).

More specifically, similar to the first embodiment, the controller 40 causes the leakage determination unit 42 to determine the presence or absence of a leaking cell based on the behavior of the cell voltages while causing the pressure-difference control unit 41 to monotonically increase the pressure difference. In the present embodiment, when the leakage determination unit 42 determines that a leaking cell is present, the operation control unit 43 determines the pressure difference from, for example, the detection values obtained by the fuel-electrode-inlet pressure sensor 23 and the oxidizing-electrode-inlet pressure sensor 32. Then, the thus-determined pressure difference is compared with the predetermined allowable pressure difference range for normal operation, and it is determined whether the pressure difference at the time of determination of the presence of a leaking cell is within the allowable pressure difference range or outside the allowable pressure difference range. Then, if the pressure difference at the time of determination of the presence of a leaking cell is outside the allowable pressure difference range, the operation control unit 43 continues the system operation. If the pressure difference at the time of determination of the presence of a leaking cell is within the allowable pressure difference range, the operation control unit 43 continues the system operation after updating the allowable pressure difference range permitted in normal operation to a range smaller than the pressure difference at the time of determination of the presence of a leaking cell.

As described above, in the fuel cell system according to the present embodiment, if the controller 40 determines that a leaking cell is present in the leakage determination process, it is determined whether the pressure difference at the time of determination of the presence of a leaking cell is within the allowable pressure difference range permitted in normal operation. If the pressure difference is outside the allowable pressure difference range, the system operation is continued. If the pressure difference is within the allowable pressure difference range, the system operation is continued after the allowable pressure difference range is updated to a range smaller than the pressure difference at the time of determination of the presence of a leaking cell. Therefore, the system operation can be continued for a longer time compared with that in the third embodiment, and the system operation can be effectively prevented from being stopped when it is not necessary to stop the system operation.

Fifth Embodiment

A fifth embodiment of the present invention will now be described. In the fifth embodiment, the measurement of the cell voltages performed by the cell-voltage measuring devices 13 is optimized. The structure and operation of the fuel gas system according to the present embodiment are similar to those of the first embodiment. Therefore, only the characteristic parts of the present embodiment will be described below, and explanations similar to those of the first embodiment will be omitted.

In the fuel cell system according to the present embodiment, the cell voltage of each fuel cell 11 or each group of fuel cells 11 is measured at a plurality of positions on the cell face by the cell-voltage measuring devices 13. Therefore, the time required for detecting a leaking cell can be reduced.

In a leaking cell, the oxygen partial pressure at the oxidizing electrode largely decreases at a leakage area due to the flow of the fuel gas from the fuel-electrode side to the oxidizing-electrode side. The leakage area is, for example, an area where a hole is formed in the solid polymer electrolyte membrane or an area where the thickness of the solid polymer electrolyte membrane is small. In the leakage area, electric power cannot be generated due to the combustion reaction, and the oxygen partial pressure is further reduced. Therefore, the voltage reduction occurs first in the leakage area. The side surfaces of each fuel cell 11 are electrically connected to the separators, which are conductive. Since each fuel cell 11 has an electrical resistance in the planar direction thereof, a current distribution is generated such that the voltage reduction rate differs between the leakage area and other areas along the cell face of each fuel cell 11. Therefore, if the cell voltage of each fuel cell 11 is measured at a single position on the cell face by the corresponding cell-voltage measuring device 13, the following problem may occur. That is, depending on the positional relationship between the leakage area and the measurement position of the cell-voltage measuring device 13, there is a possibility that it will take a long time to detect a leaking cell based on the cell voltage measured by the cell-voltage measuring device 13.

Accordingly, in the fuel cell system of the present embodiment, the cell voltage of each fuel cell 11 or each group of fuel cells 11 is measured at a plurality of positions on the cell face by the cell-voltage measuring devices 13, so that one or more measurement positions can be located near the leakage area. As a result, the time required for detecting a leaking cell can be reduced.

Figure 14:
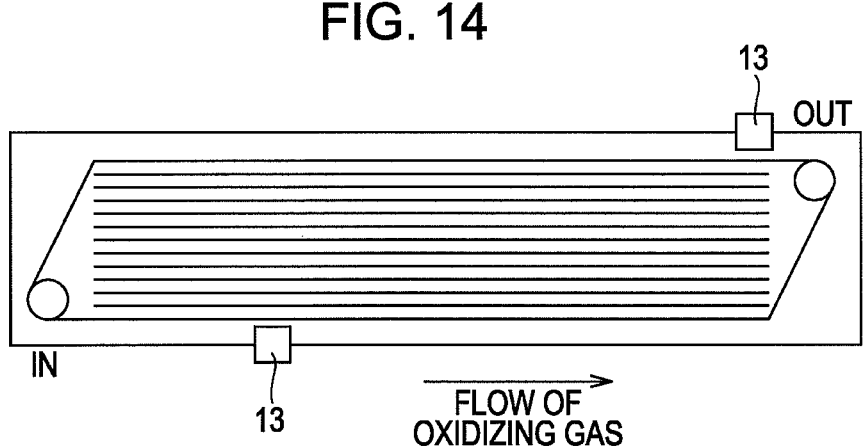
FIG. 14 is a diagram illustrating an example of positions at which a cell voltage is measured in the case where an oxidizing-gas flow path is a parallel flow path.

In a leaking cell, the fuel gas that flows from the fuel-electrode side to the oxidizing-electrode side is guided by the flow of the oxidizing gas in the oxidizing-gas flow path in the separator to the outlet of the oxidizing-gas flow path, each separator having a planar cell face facing outwardly from the membrane electrode assembly. Therefore, comparing the positions upstream and downstream of the leakage area along the oxidizing-gas flow path, the oxygen partial pressure tends to be decreased by a greater amount, and the cell voltage is reduced by a larger amount, at the downstream position compared with the upstream position along the oxidizing-gas flow path. Therefore, as shown in FIG. 14, the cell voltage can be measured by the cell-voltage measuring devices 13 at at least two measurement positions including a position near the outlet of the oxidizing-gas flow path on the cell face. In such a case, the possibility that the cell voltage can be measured at a position where the cell voltage is largely reduced increases and the time required for detecting a leaking cell can be effectively reduced. FIG. 14 shows an example of the cell-voltage measurement positions in the case where the oxidizing-gas flow path is a parallel flow path. Even when the oxidizing-gas flow path has a shape other than that of the parallel flow path, the time required for detecting a leaking cell can be reduced by measuring the cell voltage by the cell-voltage measuring devices 13 at at least two positions including a position near the outlet of the oxidizing-gas flow path on the cell face.

Figure 15:
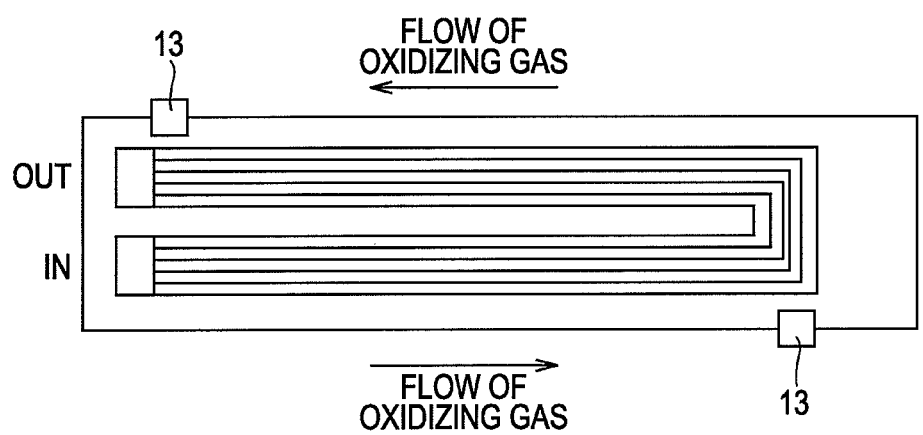
FIG. 15 is a diagram illustrating an example of positions at which the cell voltage is measured in the case where the oxidizing-gas flow path is a U-turn flow path.

FIG. 15 shows an example in which the oxidizing-gas flow path is a U-turn flow path which is bent along the cell face. In this case, the outlet and inlet of the oxidizing-gas flow path are at the same end of the cell face, and an intermediate bent portion of the oxidizing-gas flow path is at the other end of the cell face. In this case, the cell voltage is preferably measured by the cell-voltage measuring devices 13 at at least two positions including a position near the inlet and outlet of the oxidizing-gas flow path at one end of the cell face and a position near the intermediate bent portion of the oxidizing-gas flow path at the other end of the cell face. In such a case, even when the leakage occurs at a position near the intermediate bent portion of the oxidizing-gas flow path, the time required for detecting a leaking cell can be reduced.

As described above, in the fuel cell system according to the present embodiment, the cell voltage of each fuel cell 11 or each group of fuel cells 11 is measured by the cell-voltage measuring devices 13 at a plurality of positions on the cell face. Therefore, the possibility that the cell-voltage measurement positions will be near the leakage area is increased and the time required for detecting a leaking cell can be reduced.

Although the first to fifth embodiments of the present invention are described in detail above, the technical scope of the present invention is not limited to any of the above-described embodiments. The present invention includes various modifications that can be easily conceived from the above-described embodiments. For example, in the above-described embodiments, the pressure difference between the fuel electrode and the oxidizing electrode in each fuel cell 11 is detected by the fuel-electrode-inlet pressure sensor 23, the fuel-electrode-outlet pressure sensor 26, the oxidizing-electrode-inlet pressure sensor 32, and the oxidizing-electrode-outlet pressure sensor 34. However, a pressure-difference sensor may be provided between the fuel electrode and the oxidizing electrode in each fuel cell 11, and the output from the pressure-difference sensor may be monitored.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel cell system, comprising:
a fuel cell stack in which a plurality of fuel cells are stacked in one or more groups of fuel cells, each fuel cell including a fuel electrode to which fuel gas containing hydrogen is supplied at a fuel gas supply pressure, an oxidizing electrode to which oxidizing gas containing oxygen is supplied at an oxidizing gas supply pressure, and an electrolyte membrane disposed between the fuel electrode and the oxidizing electrode, the membrane having a fuel-electrode side and an oxidizing-electrode side;
a pressure-difference control unit programmed to generate a pressure difference across the membrane between the fuel electrode and the oxidizing electrode in each fuel cell and for changing the pressure difference, the pressure difference being such that the pressure at the fuel electrode is higher than the pressure at the oxidizing electrode;
a cell-voltage measuring device for measuring a cell voltage of each fuel cell or each group of fuel cells in the fuel cell stack; and
a leakage determination unit programmed to determine the presence or absence of a leaking cell based on the behavior of the cell voltage of each fuel cell as measured by the cell-voltage measuring device while the pressure-difference control unit gradually increases the pressure difference with time, a leaking cell being a fuel cell in which gas flows through the electrolyte membrane from the fuel-electrode side to the oxidizing-electrode side,
wherein the pressure-difference control unit is programmed to adjust one or both of the fuel gas supply pressure and the oxidizing gas supply pressure from a state in which the fuel gas pressure at a fuel electrode inlet is substantially equal to the oxidizing gas supply pressure at an oxidizing gas supply inlet to increase the pressure difference monotonically by reducing the oxidizing gas supply pressure to achieve a predetermined pressure difference, and
wherein the leakage determination unit is programmed to monitor the cell voltage during the monotonic increase in pressure difference to determine the presence or absence of a leaking cell.

2. The fuel cell system according to claim 1,
wherein the leakage determination unit determines that a leaking cell is present when the voltage of at least one fuel cell or group of fuel cells is less than a predetermined voltage threshold.

3. The fuel cell system according to claim 1,
wherein the leakage determination unit determines that a leaking cell is present when a voltage difference of at least one fuel cell or group of fuel cells is greater than or equal to a predetermined voltage difference threshold, the voltage difference being the difference between the cell voltage and an average cell voltage measured by the cell-voltage measuring device while the pressure-difference control unit increases the pressure difference with time.

4. The fuel cell system according to claim 1,
wherein the leakage determination unit is programmed to determine that a leaking cell is present when a voltage reduction rate difference of at least one fuel cell or group of fuel cells is equal to or greater than a predetermined voltage reduction rate threshold, the voltage reduction rate difference being the difference between the reduction rate of the cell voltage and the reduction rate of an average cell voltage measured by the cell-voltage measuring device while the pressure-difference control unit increases the pressure difference with time.

5. The fuel cell system according to claim 1,
wherein the cell-voltage measuring device measures the cell voltage at a plurality of positions on a cell face of at least one fuel cell.

6. The fuel cell system according to claim 5,
wherein each fuel cell includes an oxidizing-gas flow path having an outlet; and
wherein the positions at which the cell-voltage measuring device measures the cell voltage include at least a position near the outlet of the oxidizing-gas flow path on the cell face.

7. The fuel cell system according to claim 5,
wherein each fuel cell includes an oxidizing-gas flow path having an inlet, an outlet, and a bend forming a U-shape along the cell face, the inlet and the outlet being positioned at a first end of the cell face and the bend positioned at a second end of the cell face;
wherein the positions at which the cell-voltage measuring device measures the cell voltage include at least one of a position near the outlet and the inlet of the oxidizing-gas flow path at the first end of the cell face; and
wherein the positions at which the cell-voltage measuring device measures the cell voltage further include a position near the bend of the oxidizing-gas flow path at the second end of the cell face.

8. The fuel cell system according to claim 1,
wherein the pressure-difference control unit generates the pressure difference and increases the pressure difference with time when the cell voltage measured by the cell-voltage measuring device is in an activation overvoltage region; and
wherein the leakage determination unit determines the presence or absence of a leaking cell based on the behavior of the cell voltage in the activation overvoltage region.

9. The fuel cell system according to claim 8, the oxidizing gas being supplied at a normal oxidizing gas supply flow rate determined from a load current and an operating temperature of the fuel cell stack during normal operation of the fuel cell system,
wherein the pressure-difference control unit generates the pressure difference and increases the pressure difference with time when the oxidizing gas supply flow rate is reduced to below the normal oxidizing gas supply flow rate.

10. The fuel cell system according to claim 8, the oxidizing gas being supplied at an oxidizing gas supply flow rate,
wherein the pressure-difference control unit generates the pressure difference and increases the pressure difference with time when the oxidizing gas supply flow rate is stopped.

11. The fuel cell system according to claim 1, further comprising:
an operation control unit for controlling the operation of the fuel cell system in accordance with the result of the determination performed by the leakage determination unit.

12. The fuel cell system according to claim 11,
wherein the operation control unit is programmed to stop the operation of the fuel cell system if the leakage determination unit determines that a leaking cell is present.

13. The fuel cell system according to claim 11,
wherein the operation control unit is programmed to determine, when the leakage determination unit determines that a leaking cell is present, whether or not the pressure difference is within an allowable pressure difference range permitted in normal operation.

14. The fuel cell system according to claim 13,
wherein the operation control unit stops the operation of the fuel cell system if the pressure difference is within the allowable pressure difference range and continues the operation of the fuel cell system if the pressure difference is outside the allowable pressure difference range.

15. The fuel cell system according to claim 13,
wherein when the pressure difference is within the allowable pressure difference range, the operation control unit updates the allowable pressure difference range to an updated allowable pressure range smaller than the pressure difference at the time of the determination that the leaking cell is present and continues the operation of the fuel cell system if the pressure difference is outside the updated allowable pressure difference range.

16. The fuel cell system according to claim 1,
wherein the fuel gas is supplied at a fuel gas flow rate and the oxidizing gas is supplied at an oxidizing gas flow rate; and
wherein the pressure-difference control unit is programmed to maintain for a predetermined time period the pressure difference at which the leaking cell was determined and to vary the fuel gas flow rate within a predetermined range when the leakage determination unit determines the presence of a suspected leaking cell, such that if the cell voltage of the suspected leaking cell varies during the predetermined time period then the suspected leaking cell is determined to be a leaking cell and if the cell voltage of the suspected leaking cell does not vary during the predetermined time period then the suspected leaking cell is determined not to be a leaking cell.

17. A fuel cell system, comprising:
a fuel cell stack in which a plurality of fuel cells are stacked in one or more groups of fuel cells, each fuel cell including a fuel electrode to which fuel gas containing hydrogen is supplied at a fuel gas supply pressure, an oxidizing electrode to which oxidizing gas containing oxygen is supplied at an oxidizing gas supply pressure, and an electrolyte membrane disposed between the fuel electrode and the oxidizing electrode, the membrane having a fuel-electrode side and an oxidizing-electrode side;
a pressure-difference control unit programmed to generate a pressure difference across the membrane between the fuel electrode and the oxidizing electrode in each fuel cell and for changing the pressure difference, the pressure difference being such that the pressure at the fuel electrode is higher than the pressure at the oxidizing electrode;
a cell-voltage measuring device for measuring a cell voltage of each fuel cell or each group of fuel cells in the fuel cell stack; and
a leakage determination unit programmed to determine the presence or absence of a leaking cell based on the behavior of the cell voltage of each fuel cell as measured by the cell-voltage measuring device while the pressure-difference control unit increases the pressure difference with time, a leaking cell being a fuel cell in which gas flows through the electrolyte membrane from the fuel-electrode side to the oxidizing-electrode side;
wherein the pressure-difference control unit is configured to adjust one or both of the fuel gas supply pressure and the oxidizing gas supply pressure to achieve the pressure difference;
wherein when the fuel gas supply pressure before the pressure difference is generated is equal to or greater than a predetermined fuel gas pressure threshold, the pressure-difference control unit generates the pressure difference and increases the pressure difference with time by reducing the oxidizing gas supply pressure; and
wherein when the fuel gas supply pressure before the pressure difference is generated is less than the predetermined fuel gas pressure threshold, the pressure-difference control unit generates the pressure difference by increasing the fuel gas supply pressure.

18. A fuel-cell control apparatus, comprising:
a fuel cell stack in which a plurality of fuel cells are stacked, each fuel cell including a fuel electrode, an oxidizing electrode, and a electrolyte membrane disposed between the fuel electrode and the oxidizing electrode, the fuel cell stack including fuel-gas supplying means which supplies fuel gas containing hydrogen to the fuel electrode of each fuel cell and oxidizing-gas supplying means which supplies oxidizing gas containing oxygen to the oxidizing electrode of each fuel cell;
cell-voltage measuring means for measuring a cell voltage for each fuel cell or one or more groups of fuel cells;
pressure-difference control means programmed to generate a pressure difference between the pressure of the fuel gas at the fuel electrode and the pressure of the oxidizing gas at the oxidizing electrode in each fuel cell and increasing the pressure difference with time, the pressure difference being such that a pressure at the fuel electrode is higher than a pressure at the oxidizing electrode; and
leakage determination means for determining the presence or absence of a leaking cell in which gas flows through the electrolyte membrane from the fuel-electrode side to the oxidizing-electrode side, the leakage determination means determining the presence of absence of a leaking cell based on the behavior of the cell voltage measured by the cell-voltage measuring means while the pressure difference is gradually increased with time,
wherein the pressure-difference control means is programmed to adjust one or both of the pressure of the fuel gas and the pressure of the oxidizing gas to achieve the pressure difference,
wherein when the pressure of the fuel gas before the pressure difference is generated is equal to or greater than a predetermined fuel gas pressure threshold, the pressure-difference control means is programmed to generate the pressure difference and to increase the pressure difference with time by reducing the pressure of the oxidizing gas, and
wherein when the pressure of the fuel gas before the pressure difference is generated is less than the predetermined fuel gas pressure threshold, the pressure-difference control means is programmed to generate the pressure difference by increasing the pressure of the fuel gas.

19. The fuel-cell control apparatus according to claim 18,
wherein the leakage determination means determines that a leaking cell is present if the difference between the cell voltage of a fuel cell or group of fuel cells and an average cell voltage of the fuel cell stack becomes equal to or greater than a predetermined voltage difference threshold while the pressure difference is increased with time and an average cell voltage, or if the cell voltage of a fuel cell or group of fuel cells become less than or equal to a predetermined voltage threshold while the pressure difference is increased with time.

20. The fuel-cell control apparatus according to claim 19, further comprising an operation control means for controlling the operation of the fuel cell system,
- wherein when the leakage determination means determines that a leaking cell is present, the operation control means determines whether or not the pressure difference at the time of the determination that a leaking cell is present is within an allowable pressure difference range permitted in normal operation; and
- wherein the operation control means stops the operation of the fuel cell system if the pressure difference at the time of the determination that the leaking cell is present is within the allowable pressure difference range and continues the operation of the fuel cell system if the pressure difference at the time of the determination that the leaking cell is present is outside the allowable pressure difference range.

* * * * *